(12) United States Patent
Ju et al.

(10) Patent No.: US 11,699,905 B2
(45) Date of Patent: Jul. 11, 2023

(54) POWER SYSTEM AND CONTROL METHOD

(71) Applicant: Huawei Digital Power Technologies Co., Ltd., Shenzhen (CN)

(72) Inventors: Hualei Ju, Shanghai (CN); Zhiwu Xu, Shanghai (CN); Haibin Guo, Shanghai (CN)

(73) Assignee: HUAWEI DIGITAL POWER TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/707,121

(22) Filed: Mar. 29, 2022

(65) Prior Publication Data

US 2022/0320866 A1     Oct. 6, 2022

(30) Foreign Application Priority Data

Mar. 31, 2021    (CN) ........................ 202110352624.X

(51) Int. Cl.
     *H02J 3/32*          (2006.01)

(52) U.S. Cl.
     CPC ...................................... *H02J 3/32* (2013.01)

(58) Field of Classification Search
     CPC ................................... H02J 3/32; H02J 1/102
     See application file for complete search history.

(56) References Cited

FOREIGN PATENT DOCUMENTS

CN        107195934 A      9/2017

OTHER PUBLICATIONS

Kaiqi Sun, Ke-Jun Li, Meiyan Wang, Guanyu Tian, Zhuo-di Wang, Zhijie Liu, Coordination control for multi-voltage-level dc grid based on the dc-dc converters, Electric Power Systems Research, vol. 178, Oct. 3, 2019, ISSN 0378-7796. (Year: 2019).*
Seyed Milad Tayebi et al.,"Advanced DC-Link Voltage Regulation and Capacitor Optimization for Three-Phase Microinverters",IEEE Transactions on Industrial Electronics, vol. 66, No. 1, Jan. 2019, Total 12 Pages.
Cheng-Yu Tang et al.,"DC-Bus Voltage Regulation Strategy for Three-Phase Back-to-Back Active Power Conditioners",2014 IEEE, Total 8 Pages.

* cited by examiner

*Primary Examiner* — Daniel Cavallari
(74) *Attorney, Agent, or Firm* — Womble Bond Dickinson (US) LLP

(57) ABSTRACT

A power system includes a controller, configured to adjust an output current of a first converter to a first current value based on a voltage of a direct current bus and a voltage threshold, where a difference between an adjusted voltage of the direct current bus and the voltage threshold is less than a difference between the unadjusted voltage of the direct current bus and the voltage threshold. The controller adjusts the output current of the first converter to a second current value based on output power of the first converter and a power threshold, where a difference between adjusted output power of the first converter and the power threshold is less than a difference between the unadjusted output power of the first converter and the power threshold. The controller adjusts the output current of the first converter based on the first current value and the second current value.

20 Claims, 6 Drawing Sheets

S401: Calculate a first current value based on a voltage of a bus and a voltage threshold, where if an output current of a first converter is adjusted to the first current value, a difference between an adjusted voltage of the direct current bus and the voltage threshold is less than a difference between the unadjusted voltage of the direct current bus and the voltage threshold

S402: Calculate a second current value based on output power of the first converter and a power threshold, where if the output current of the first converter is adjusted to the second current value, a difference between adjusted output power of the first converter and the power threshold is less than a difference between the unadjusted output power of the first converter and the power threshold

S403: Adjust the output current of the first converter based on the first current value and the second current value

FIG. 4

S501: Calculate a fourth current value based on a voltage of a bus and a voltage threshold, where if an input current of a second converter is adjusted to the fourth current value, a difference between an adjusted voltage of the direct current bus and the voltage threshold is less than a difference between the unadjusted voltage of the direct current bus and the voltage threshold

S502: Calculate a fifth current value based on input power of the second converter and a power threshold, where if the input current of the second converter is adjusted to the fifth current value, a difference between adjusted input power of the second converter and the power threshold is less than a difference between the unadjusted input power of the second converter and the power threshold

S503: Adjust the input current of the second converter based on the fourth current value and the fifth current value

FIG. 5

S601: Calculate a first current value based on a voltage of a bus and a voltage threshold, where if an input current of a first converter is adjusted to the first current value, a difference between an adjusted voltage of the direct current bus and the voltage threshold is less than a difference between the unadjusted voltage of the direct current bus and the voltage threshold

S602: Calculate a second current value based on input power of the first converter and a power threshold, where if the input current of the first converter is adjusted to the second current value, a difference between adjusted input power of the first converter and the power threshold is less than a difference between the unadjusted input power of the first converter and the power threshold

S603: Adjust the input current of the first converter based on the first current value and the second current value

FIG. 6

S701: Calculate a fourth current value based on a voltage of a bus and a voltage threshold, where if an output current of a second converter is adjusted to the fourth current value, a difference between an adjusted voltage of the direct current bus and the voltage threshold is less than a difference between the unadjusted voltage of the direct current bus and the voltage threshold

S702: Calculate a fifth current value based on output power of the second converter and a power threshold, where if the output current of the second converter is adjusted to the fifth current value, a difference between adjusted output power of the second converter and the power threshold is less than a difference between the unadjusted output power of the second converter and the power threshold

S703: Adjust the output current of the second converter based on the fourth current value and the fifth current value

FIG. 7

POWER SYSTEM AND CONTROL METHOD

CROSS-REFERENCE TO RELATED APPLICATION

This application claims priority to Chinese Patent Application No. 202110352624.X, filed on Mar. 31, 2021, which is hereby incorporated by reference in its entirety.

TECHNICAL FIELD

This solution relates to the field of power technologies, and in particular, to a power system and a control method.

BACKGROUND

When a power system supplies power to a power grid or a load, an energy storage battery or a photovoltaic battery supplies a voltage of a direct current (DC) bus to the power system by using a DC/DC converter, and further, a bus supplies power to the load by using a power conversion system (PCS). The voltage of the direct current bus fluctuates when power input into or output from the bus changes. For example, the voltage of the bus fluctuates when power input by a new energy generation system such as a photovoltaic power system into the bus fluctuates due to illumination. For another example, the voltage of the bus fluctuates when power supplied to the power grid is adjusted according to a power modulation instruction of the power grid.

When the power system supplies power to a battery, the power grid supplies the voltage of the direct current bus to the power system by using the PCS, and then the bus charges the battery by using the DC/DC converter. The voltage of the direct current bus fluctuates when power input into or output from the bus changes. For example, the voltage of the bus fluctuates when output power supplied to the power grid is adjusted according to a power modulation instruction of the power grid.

Because the bus is limited in capacity and withstand voltage, considerable bus voltage fluctuation may cause an excessively high or low bus voltage, causing damage to the bus. In principle, the system puts safety first. When the bus falls within an acceptable range, power modulation takes priority. When the voltage of the bus reaches a limit, control over the voltage of the bus takes priority to ensure that the voltage of the bus falls within the allowed range. Therefore, a controller needs to control the converter in consideration of both power and a current bus voltage value.

In a current technical solution, determining is performed by using an open-loop condition. To be specific, the voltage of the bus is reduced when it is determined that the voltage of the bus is excessively high, and the voltage of the bus is increased when it is determined that the voltage of the bus is excessively low. In the method, the voltage of the bus cannot be adjusted to a proper range in a timely manner, control over the voltage of the bus is discontinuous, and the voltage of the bus is prone to increase or decrease suddenly, and therefore the voltage of the bus is poorly controlled.

SUMMARY

Embodiments of this application provide a power system and a control method, to adjust output power supplied to a power grid or a load and control a voltage of a direct current bus not to exceed a voltage threshold, thereby smoothly controlling the voltage of the direct current bus.

According to a first aspect, an embodiment of this application provides a power system. The power system includes a first converter and a controller, the controller is configured to control output power of the first converter, an input terminal of the first converter is configured to connect to a direct current bus, and an output terminal of the first converter is connected to a power grid or a load;

the controller is configured to adjust an output current of the first converter to a first current value based on a voltage of the direct current bus and a voltage threshold, where a difference between an adjusted voltage of the direct current bus and the voltage threshold is less than a difference between the unadjusted voltage of the direct current bus and the voltage threshold;

the controller is further configured to adjust the output current of the first converter to a second current value based on the output power of the first converter and a power threshold, where a difference between adjusted output power of the first converter and the power threshold is less than a difference between the unadjusted output power of the first converter and the power threshold; and the controller is further configured to adjust the output current of the first converter based on the first current value and the second current value.

In this embodiment of this application, the first current value that can enable the current voltage of the direct current bus to approach the voltage threshold may be determined in real time based on the current voltage of the direct current bus and the voltage threshold, and the second current value that can enable the output power of the first converter to approach the power threshold may be determined in real time based on the current voltage of the direct current bus. The controller may determine a target current value based on the first current value and the second current value. When the target current value is the first current value, it can be ensured that the voltage of the direct current bus approaches the threshold of the direct current bus to enable the voltage of the direct current bus to fall within a threshold range for protection. When the target current value is the second current value, the controller controls, based on the target current value, the first converter to adjust the output power of the first converter to approach the power threshold, to meet an output power requirement. Therefore, in this technical solution, the controller may determine the target current value from the first current value and the second current value in real time to adjust output power supplied to the power grid or the load and control the voltage of the direct current bus not to exceed the voltage threshold, so that the voltage of the direct current bus is smoothly controlled.

In one embodiment, the voltage threshold is an upper limit of the voltage of the direct current bus, and the controller includes an upper voltage limit loop and a power loop;

the upper voltage limit loop is configured to adjust the output current of the first converter to the first current value based on the voltage of the direct current bus and the upper limit;

the power loop is configured to adjust the output current of the first converter to the second current value based on the output power of the first converter and the power threshold; and the controller is configured to: adjust the output current of the first converter to a larger current value in the first current value and the second current value, and determine a contention result between the upper voltage limit loop and the power loop, where if the first current value is greater than the second current value, the upper voltage limit loop succeeds in contention; or if the second current value is greater than the first current value, the power loop succeeds in contention.

In one embodiment, the voltage threshold is a lower limit of the voltage of the direct current bus, and the controller includes a lower voltage limit loop and the power loop;

the lower voltage limit loop is configured to adjust the output current of the first converter to a third current value based on the voltage of the direct current bus and the lower limit; and the controller is configured to: adjust the output current of the first converter to a smaller current value in the second current value and the third current value, and determine a contention result between the lower voltage limit loop and the power loop, where if the third current value is less than the second current value, the lower voltage limit loop succeeds in contention; or if the second current value is less than the third current value, the power loop succeeds in contention.

In one embodiment, the upper voltage limit loop is further configured to:

when the upper voltage limit loop succeeds in previous contention, obtain the first current value based on a proportion, an integral, and a derivative of a deviation between the voltage of the direct current bus and the upper limit; or when the upper voltage limit loop fails in previous contention, obtain the first current value based on a proportion of a deviation between the voltage of the direct current bus and the upper limit.

In one embodiment, the lower voltage limit loop is further configured to:

when the lower voltage limit loop succeeds in previous contention, obtain the third current value based on a proportion, an integral, and a derivative of a deviation between the voltage of the direct current bus and the lower limit; or when the lower voltage limit loop fails in previous contention, obtain the third current value based on a proportion of a deviation between the voltage of the direct current bus and the lower limit.

In one embodiment, the power loop is further configured to:

when the power loop succeeds in previous contention, obtain the second current value based on a proportion, an integral, and a derivative of a deviation between the output power of the first converter and the power threshold; or when the power loop fails in previous contention, obtain the second current value based on a proportion of a deviation between the output power of the first converter and the power threshold.

In one embodiment, the power system further includes a second converter, the controller is configured to control input power of the second converter, an input terminal of the second converter is configured to connect to a battery, and an output terminal of the second converter is connected to the direct current bus;

the controller is configured to adjust an input current of the second converter to a fourth current value based on the voltage of the direct current bus and the voltage threshold, where a difference between an adjusted voltage of the direct current bus and the voltage threshold is less than a difference between the unadjusted voltage of the direct current bus and the voltage threshold;

the controller is further configured to adjust the input current of the second converter to a fifth current value based on the input power of the second converter and the power threshold, where a difference between adjusted input power of the second converter and the power threshold is less than a difference between the unadjusted input power of the second converter and the power threshold; and the controller is further configured to adjust the input current of the second converter based on the fourth current value and the fifth current value.

In one embodiment, the voltage threshold is the upper limit of the voltage of the direct current bus, and the controller includes the upper voltage limit loop and the power loop;

the upper voltage limit loop is configured to adjust the input current of the second converter to the fourth current value based on the voltage of the direct current bus and the upper limit;

the power loop is configured to adjust the input current of the second converter to the fifth current value based on the input power of the second converter and the power threshold; and the controller is configured to: adjust the input current of the second converter to a smaller current value in the fourth current value and the fifth current value, and determine a contention result between the upper voltage limit loop and the power loop, where if the fourth current value is less than the fifth current value, the upper voltage limit loop succeeds in contention; or if the fifth current value is less than the fourth current value, the power loop succeeds in contention.

In one embodiment, the voltage threshold is the lower limit of the voltage of the direct current bus, and the controller includes the lower voltage limit loop and the power loop;

the lower voltage limit loop is configured to adjust the input current of the second converter to a sixth current value based on the voltage of the direct current bus and the lower limit; and the controller is configured to: adjust the input current of the second converter to a larger current value in the sixth current value and the fifth current value, and determine a contention result between the lower voltage limit loop and the power loop, where if the sixth current value is greater than the fifth current value, the lower voltage limit loop succeeds in contention; or if the fifth current value is greater than the sixth current value, the power loop succeeds in contention.

In one embodiment, the upper voltage limit loop is further configured to:

when the upper voltage limit loop succeeds in previous contention, obtain the fourth current value based on a proportion, an integral, and a derivative of a deviation between the voltage of the direct current bus and the upper limit; or when the upper voltage limit loop fails in previous contention, obtain the fourth current value based on a proportion of a deviation between the voltage of the direct current bus and the upper limit.

In one embodiment, the lower voltage limit loop is further configured to:

when the lower voltage limit loop succeeds in previous contention, obtain the sixth current value based on a proportion, an integral, and a derivative of a deviation between the voltage of the direct current bus and the lower limit; or when the lower voltage limit loop fails in previous contention, obtain the sixth current value based on a proportion of a deviation between the voltage of the direct current bus and the lower limit.

In one embodiment, the power loop is further configured to:

when the power loop succeeds in previous contention, obtain the fifth current value based on a proportion, an integral, and a derivative of a deviation between the input power of the second converter and the power threshold; or when the power loop fails in previous contention, obtain the fifth current value based on a proportion of a deviation between the input power of the second converter and the power threshold.

According to a second aspect, an embodiment of this application provides a power system. The power system includes a first converter and a controller, the controller is configured to control input power of the first converter, an input terminal of the first converter is connected to a power grid, and an output terminal of the first converter is connected to a direct current bus;

the controller is configured to adjust an input current of the first converter to a first current value based on a voltage of the direct current bus and a voltage threshold, where a difference between an adjusted voltage of the direct current bus and the voltage threshold is less than a difference between the unadjusted voltage of the direct current bus and the voltage threshold;

the controller is further configured to adjust the input current of the first converter to a second current value based on the input power of the first converter and the power threshold, where a difference between adjusted input power of the first converter and the power threshold is less than a difference between the unadjusted input power of the first converter and the power threshold; and the controller is further configured to adjust the input current of the first converter based on the first current value and the second current value.

In one embodiment, the voltage threshold is an upper limit of the voltage of the direct current bus, and the controller includes an upper voltage limit loop and a power loop;

the upper voltage limit loop is configured to adjust the input current of the first converter to the first current value based on the voltage of the direct current bus and the upper limit;

the power loop is configured to adjust the input current of the first converter to the second current value based on the input power of the first converter and the power threshold; and the controller is configured to: adjust the input current of the first converter to a smaller current value in the first current value and the second current value, and determine a contention result between the upper voltage limit loop and the power loop, where if the first current value is less than the second current value, the upper voltage limit loop succeeds in contention; or if the second current value is less than the first current value, the power loop succeeds in contention.

In one embodiment, the voltage threshold is a lower limit of the voltage of the direct current bus, and the controller includes a lower voltage limit loop and the power loop;

the lower voltage limit loop is configured to adjust the input current of the first converter to a third current value based on the voltage of the direct current bus and the lower limit; and the controller is configured to: adjust the input current of the first converter to a larger current value in the second current value and the third current value, and determine a contention result between the lower voltage limit loop and the power loop, where if the third current value is greater than the second current value, the lower voltage limit loop succeeds in contention; or if the second current value is greater than the third current value, the power loop succeeds in contention.

In one embodiment, the upper voltage limit loop is further configured to:

when the upper voltage limit loop succeeds in previous contention, obtain the first current value based on a proportion, an integral, and a derivative of a deviation between the voltage of the direct current bus and the upper limit; or when the upper voltage limit loop fails in previous contention, obtain the first current value based on a proportion of a deviation between the voltage of the direct current bus and the upper limit.

In one embodiment, the lower voltage limit loop is further configured to:

when the lower voltage limit loop succeeds in previous contention, obtain the third current value based on a proportion, an integral, and a derivative of a deviation between the voltage of the direct current bus and the lower limit; or when the lower voltage limit loop fails in previous contention, obtain the third current value based on a proportion of a deviation between the voltage of the direct current bus and the lower limit.

In one embodiment, the power loop is further configured to:

when the power loop succeeds in previous contention, obtain the second current value based on a proportion, an integral, and a derivative of a deviation between the input power of the first converter and the power threshold; or when the power loop fails in previous contention, obtain the second current value based on a proportion of a deviation between the input power of the first converter and the power threshold.

In one embodiment, the power system further includes a second converter, the controller is configured to control output power of the second converter, an input terminal of the first converter is connected to the direct current bus, and an output terminal of the first converter is connected to a battery;

the controller is configured to adjust an output current of the second converter to a fourth current value based on the voltage of the direct current bus and the voltage threshold, where a difference between an adjusted voltage of the direct current bus and the voltage threshold is less than a difference between the unadjusted voltage of the direct current bus and the voltage threshold;

the controller is further configured to adjust the output current of the second converter to a fifth current value based on the output power of the second converter and the power threshold, where a difference between adjusted output power of the second converter and the power threshold is less than a difference between the unadjusted output power of the second converter and the power threshold; and the controller is further configured to adjust the output current of the second converter based on the fourth current value and the fifth current value.

In one embodiment, the voltage threshold is the upper limit of the voltage of the direct current bus, and the controller includes the upper voltage limit loop and the power loop;

the upper voltage limit loop is configured to adjust the output current of the second converter to the fourth current value based on the voltage of the direct current bus and the upper limit;

the power loop is configured to adjust the output current of the second converter to the fifth current value based on the output power of the fourth converter and the power threshold; and the controller is configured to: adjust the output current of the second converter to a larger current value in the fourth current value and the fifth current value, and determine a contention result between the upper voltage limit loop and the power loop, where if the fourth current value is greater than the fifth current value, the upper voltage limit loop succeeds in contention; or if the fifth current value is greater than the fourth current value, the power loop succeeds in contention.

In one embodiment, the voltage threshold is the lower limit of the voltage of the direct current bus, and the controller includes the lower voltage limit loop and the power loop;

the lower voltage limit loop is configured to adjust the output current of the second converter to a sixth current value based on the voltage of the direct current bus and the lower limit; and the controller is configured to: adjust the output current of the second converter to a smaller current value in the sixth current value and the fifth current value, and determine a contention result between the lower voltage limit loop and the power loop, where if the sixth current value is less than the fifth current value, the lower voltage limit loop succeeds in contention; or if the fifth current value is less than the sixth current value, the power loop succeeds in contention.

In one embodiment, the upper voltage limit loop is further configured to:

when the upper voltage limit loop succeeds in previous contention, obtain the fourth current value based on a proportion, an integral, and a derivative of a deviation between the voltage of the direct current bus and the upper limit; or when the upper voltage limit loop fails in previous contention, obtain the fourth current value based on a proportion of a deviation between the voltage of the direct current bus and the upper limit.

In one embodiment, the lower voltage limit loop is further configured to:

when the lower voltage limit loop succeeds in previous contention, obtain the sixth current value based on a proportion, an integral, and a derivative of a deviation between the voltage of the direct current bus and the lower limit; or when the lower voltage limit loop fails in previous contention, obtain the sixth current value based on a proportion of a deviation between the voltage of the direct current bus and the lower limit.

In one embodiment, the power loop is further configured to:

when the power loop succeeds in previous contention, obtain the fifth current value based on a proportion, an integral, and a derivative of a deviation between the output power of the second converter and the power threshold; or when the power loop fails in previous contention, obtain the fifth current value based on a proportion of a deviation between the output power of the second converter and the power threshold.

According to a third aspect, an embodiment of this application provides a control method, applied to a power system. The power system includes a first converter and a controller, the controller is configured to control output power of the first converter, an input terminal of the first converter is connected to a direct current bus, and an output terminal of the first converter is connected to a power grid or a load. The method includes:

calculating a first current value based on a voltage of the direct current bus and a voltage threshold, where if an output current of the first converter is adjusted to the first current value, a difference between an adjusted voltage of the direct current bus and the voltage threshold is less than a difference between the unadjusted voltage of the direct current bus and the voltage threshold;

calculating a second current value based on the output power of the first converter and a power threshold, where if the output current of the first converter is adjusted to the second current value, a difference between adjusted output power of the first converter and the power threshold is less than a difference between the unadjusted output power of the first converter and the power threshold; and adjusting the output current of the first converter based on the first current value and the second current value.

In one embodiment, the voltage threshold is an upper limit of the voltage of the direct current bus or a lower limit of the voltage of the direct current bus, and the controller includes an upper voltage limit loop and/or a lower voltage limit loop; and the calculating a first current value based on a voltage of the direct current bus and a voltage threshold includes:

calculating, by the upper voltage limit loop, the first current value based on the voltage of the direct current bus and the upper limit; or calculating, by the lower voltage limit loop, a third current value based on the voltage of the direct current bus and the lower limit.

In one embodiment, the controller includes a power loop, and the calculating a second current value based on the output power of the first converter and a power threshold includes:

calculating, by the power loop, the second current value based on the output power of the first converter and the power threshold.

In one embodiment, the voltage threshold is the upper limit of the voltage of the direct current bus, and the adjusting the output current of the first converter based on the first current value and the second current value includes:

adjusting the output current of the first converter to a larger current value in the first current value and the second current value; and determining a contention result between the upper voltage limit loop and the power loop, where if the first current value is greater than the second current value, the upper voltage limit loop succeeds in contention; or if the second current value is greater than the first current value, the power loop succeeds in contention.

In one embodiment, the voltage threshold is the lower limit of the voltage of the direct current bus, and the adjusting the output current of the first converter based on the first current value and the second current value includes:

adjusting the output current of the first converter to a smaller current value in the second current value and the third current value; and determining a contention result between the lower voltage limit loop and the power loop, where if the third current value is less than the second current value, the lower voltage limit loop succeeds in contention; or if the second current value is less than the third current value, the power loop succeeds in contention.

In one embodiment, the calculating, by the upper voltage limit loop, the first current value based on the voltage of the direct current bus and the upper limit includes:

when the upper voltage limit loop succeeds in previous contention, obtaining the first current value based on a proportion, an integral, and a derivative of a deviation between the voltage of the direct current bus and the upper limit; or when the upper voltage limit loop fails in previous contention, obtaining the first current value based on a proportion of a deviation between the voltage of the direct current bus and the upper limit.

In one embodiment, the calculating, by the lower voltage limit loop, a third current value based on the voltage of the direct current bus and the voltage threshold includes:

when the lower voltage limit loop succeeds in previous contention, obtaining the third current value based on a proportion, an integral, and a derivative of a deviation between the voltage of the direct current bus and the lower limit; or when the lower voltage limit loop fails in previous contention, obtaining the third current value based on a proportion of a deviation between the voltage of the direct current bus and the lower limit.

In one embodiment, the calculating, by the power loop, the second current value based on the output power of the first converter and the power threshold includes:

when the power loop succeeds in previous contention, obtaining the second current value based on a proportion, an integral, and a derivative of a deviation between the output power of the first converter and the power threshold; or when the power loop fails in previous contention, obtaining the second current value based on a proportion of a deviation between the output power of the first converter and the power threshold.

In one embodiment, the power system further includes a second converter, the controller controls input power of the second converter, an input terminal of the second converter is connected to a battery, and an output terminal of the second converter is connected to the direct current bus. The method further includes:

calculating a fourth current value based on the voltage of the direct current bus and the voltage threshold, where if an input current of the second converter is adjusted to the fourth current value, a difference between an adjusted voltage of the direct current bus and the voltage threshold is less than a difference between the unadjusted voltage of the direct current bus and the voltage threshold;

calculating a fifth current value based on the input power of the second converter and the power threshold, where if the input current of the second converter is adjusted to the fifth current value, a difference between adjusted input power of the second converter and the power threshold is less than a difference between the unadjusted input power of the second converter and the power threshold; and adjusting the input current of the second converter based on the fourth current value and the fifth current value.

According to a fourth aspect, an embodiment of this application provides a control method. The power system includes a first converter and a controller, the controller is configured to control input power of the first converter, an input terminal of the first converter is connected to a power grid, and an output terminal of the first converter is connected to a direct current bus. The method includes:

calculating a first current value based on a voltage of the direct current bus and a voltage threshold, where if an input current of the first converter is adjusted to the first current value, a difference between an adjusted voltage of the direct current bus and the voltage threshold is less than a difference between the unadjusted voltage of the direct current bus and the voltage threshold;

calculating a second current value based on the input power of the first converter and a power threshold, where if the input current of the first converter is adjusted to the second current value, a difference between adjusted input power of the first converter and the power threshold is less than a difference between the unadjusted input power of the first converter and the power threshold; and adjusting the input current of the first converter based on the first current value and the second current value.

In one embodiment, the voltage threshold is an upper limit of the voltage of the direct current bus or a lower limit of the voltage of the direct current bus, and the controller includes an upper voltage limit loop and/or a lower voltage limit loop; and the calculating a first current value based on a voltage of the direct current bus and a voltage threshold includes:

calculating, by the upper voltage limit loop, the first current value based on the voltage of the direct current bus and the upper limit; or calculating, by the lower voltage limit loop, a third current value based on the voltage of the direct current bus and the lower limit.

In one embodiment, the controller includes a power loop, and the calculating a second current value based on the input power of the first converter and a power threshold includes:

calculating, by the power loop, the second current value based on the input power of the first converter and the power threshold.

In one embodiment, the voltage threshold is the upper limit of the voltage of the direct current bus, and the adjusting the input current of the first converter based on the first current value and the second current value includes:

adjusting the input current of the first converter to a smaller current value in the first current value and the second current value; and determining a contention result between the upper voltage limit loop and the power loop, where if the first current value is less than the second current value, the upper voltage limit loop succeeds in contention; or if the second current value is less than the first current value, the power loop succeeds in contention.

In one embodiment, the voltage threshold is the lower limit of the voltage of the direct current bus, and the adjusting the input current of the first converter based on the first current value and the second current value includes:

adjusting the input current of the first converter to a larger current value in the second current value and the fourth current value; and determining a contention result between the lower voltage limit loop and the power loop, where if the fourth current value is greater than the second current value, the lower voltage limit loop succeeds in contention; or if the second current value is greater than the fourth current value, the power loop succeeds in contention.

In one embodiment, the calculating, by the upper voltage limit loop, the first current value based on the voltage of the direct current bus and the voltage threshold includes:

when the upper voltage limit loop succeeds in previous contention, obtaining the first current value based on a proportion, an integral, and a derivative of a deviation between the voltage of the direct current bus and the upper limit; or when the upper voltage limit loop fails in previous contention, obtaining the first current value based on a proportion of a deviation between the voltage of the direct current bus and the upper limit.

In one embodiment, the calculating, by the lower voltage limit loop, a third current value based on the voltage of the direct current bus and the voltage threshold includes:

when the lower voltage limit loop succeeds in previous contention, obtaining the third current value based on a proportion, an integral, and a derivative of a deviation between the voltage of the direct current bus and the lower limit; or when the lower voltage limit loop fails in previous contention, obtaining the third current value based on a proportion of a deviation between the voltage of the direct current bus and the lower limit.

In one embodiment, the calculating, by the power loop, the second current value based on the input power of the first converter and the power threshold includes:

when the power loop succeeds in previous contention, obtaining the second current value based on a proportion, an integral, and a derivative of a deviation between the input power of the first converter and the power threshold; or when the power loop fails in previous contention, obtaining the second current value based on a proportion of a deviation between the input power of the first converter and the power threshold.

In one embodiment, the power system further includes a second converter, the controller is configured to control output power of the second converter, an input terminal of the first converter is connected to the direct current bus, and an output terminal of the first converter is connected to a battery. The method further includes:

calculating a fourth current value based on the voltage of the direct current bus and the voltage threshold, where if an output current of the second converter is adjusted to the fourth current value, a difference between an adjusted voltage of the direct current bus and the voltage threshold is less than a difference between the unadjusted voltage of the direct current bus and the voltage threshold;

calculating a fifth current value based on the output power of the second converter and the power threshold, where if the output current of the second converter is adjusted to the fifth current value, a difference between adjusted output power of the second converter and the power threshold is less than a difference between the unadjusted output power of the second converter and the power threshold; and adjusting the output current of the second converter based on the fourth current value and the fifth current value.

BRIEF DESCRIPTION OF DRAWINGS

The following describes the accompanying drawings used in embodiments of this application.

FIG. 4 is a flowchart of a control method according to an embodiment of this application;

FIG. 5 is a flowchart of another control method according to an embodiment of this application;

FIG. 6 is a flowchart of still another control method according to an embodiment of this application; and FIG. 7 is a flowchart of yet another control method according to an embodiment of this application.

DESCRIPTION OF EMBODIMENTS

Terms used in the following embodiments of this application are merely intended to describe specific embodiments, but are not intended to limit embodiments of this application. The terms "one", "a", "the", "the foregoing", and "this" of singular forms used in this specification and the appended claims of embodiments in this application are also intended to include plural forms, unless otherwise specified in the context clearly. It should be further understood that the term "and/or" used in embodiments of this application refers to and includes any or all possible combinations of one or more of the listed items.

For better understanding of a power system and a control method provided in embodiments of this application, the following first describes a system architecture used in embodiments of this application.

Figure 1:
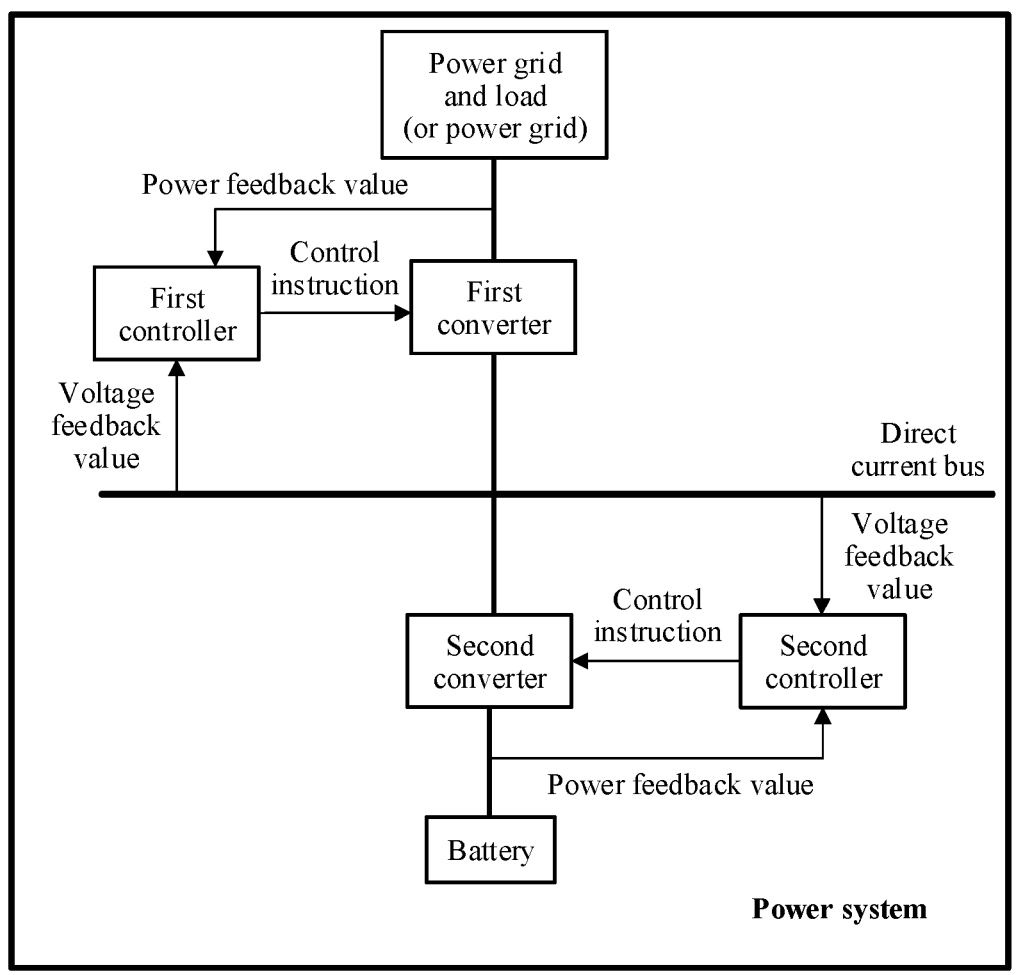
FIG. 1 is a schematic diagram of an architecture of a power system according to an embodiment of this application.

FIG. 1 is a schematic diagram of an architecture of a power system according to an embodiment of this application. As shown in FIG. 1, the architecture of the system may include a power grid or a load, a first converter, a direct current bus (which may also be referred to as a bus), a second converter, a battery, and a controller. The controller may include a first controller and a second controller, the first controller may be configured to control input power or input output power of the first converter, and the second controller may be configured to control input power or output power of the second converter.

The first converter may be a direct current DC/alternating current AC conversion module (which may also be referred to as a DC/AC converter), or may be a power conversion system (Power Conversion System, PCS). The second converter may be a direct current DC/DC conversion module (which may also be referred to as a DC/DC converter), or may be an inverter. The power grid is also referred to as a power grid, and includes a substation and transmission and distribution lines of various voltages in the power system, namely, a substation unit, a transmission unit, and a distribution unit, configured to transmit and allocate electric energy and change a voltage.

It should be noted that the power system provided in this application may be a hybrid power system based on new energy generation and different types of batteries, for example, a photovoltaic power system. New energy generation may include solar power generation (for example, solar photovoltaic or solar thermal-photovoltaic power generation), geothermal power generation, wind power generation, marine power generation (for example, wave or tidal power generation), and biomass power generation. New energy generation has characteristics, for example, having no mechanical component, noise, and pollution and being reliable, and therefore has a broad application prospect in communications power systems in remote regions. The power system provided in this application may be applied to base station devices in remote regions without mains electricity or poor mains electricity, a plurality of types of power generation devices such as a photovoltaic power generation device or a wind power generation device, or another power consumption device (for example, a power grid, a home device, or industrial and commercial power consumption devices). This may be specifically determined based on an actual application scenario, and is not limited herein.

Figure 2A:
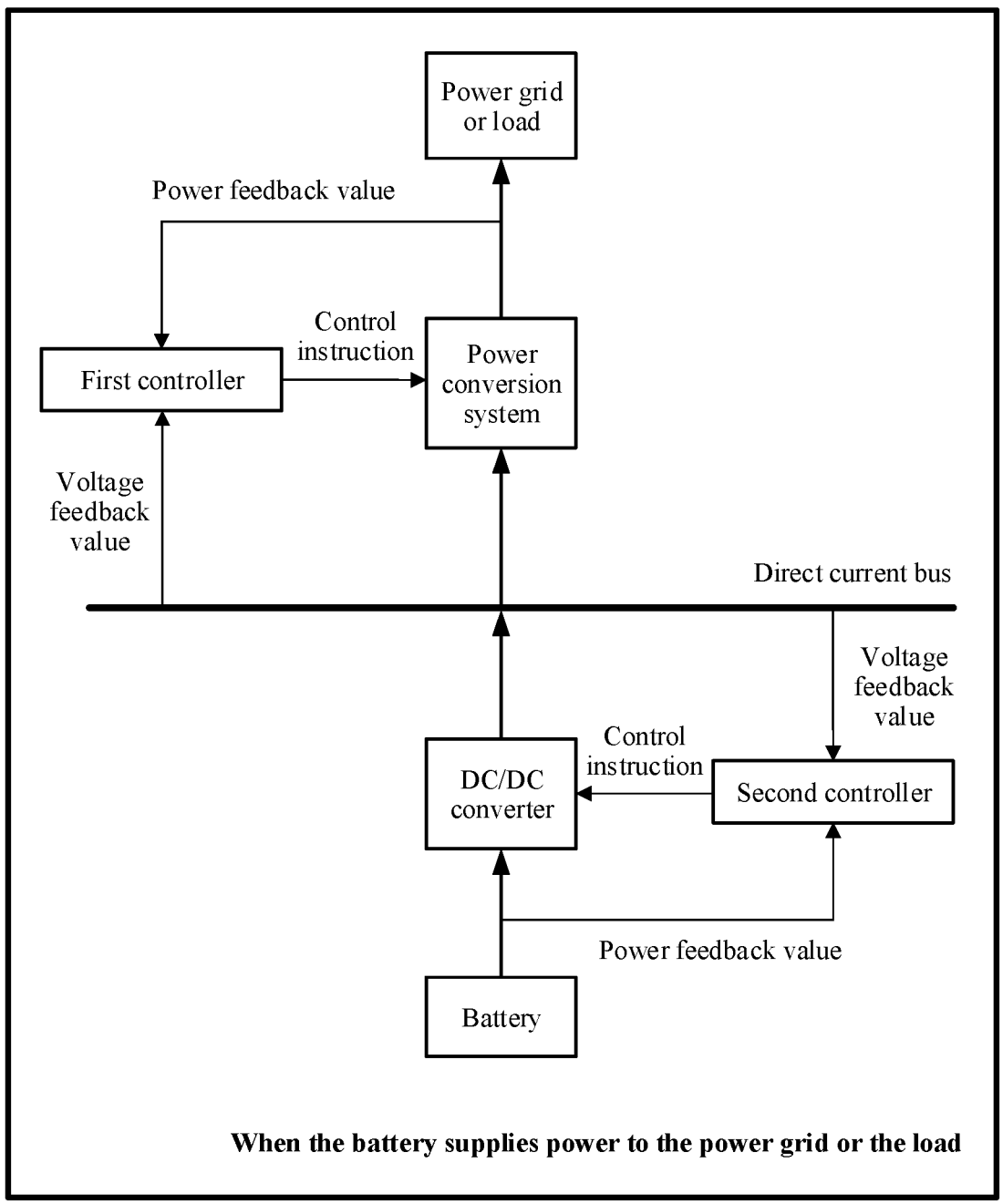
FIG. 2A is a schematic diagram of applying a power system to a scenario in which a battery supplies power to a power grid or a load according to this application.
Figure 2B:
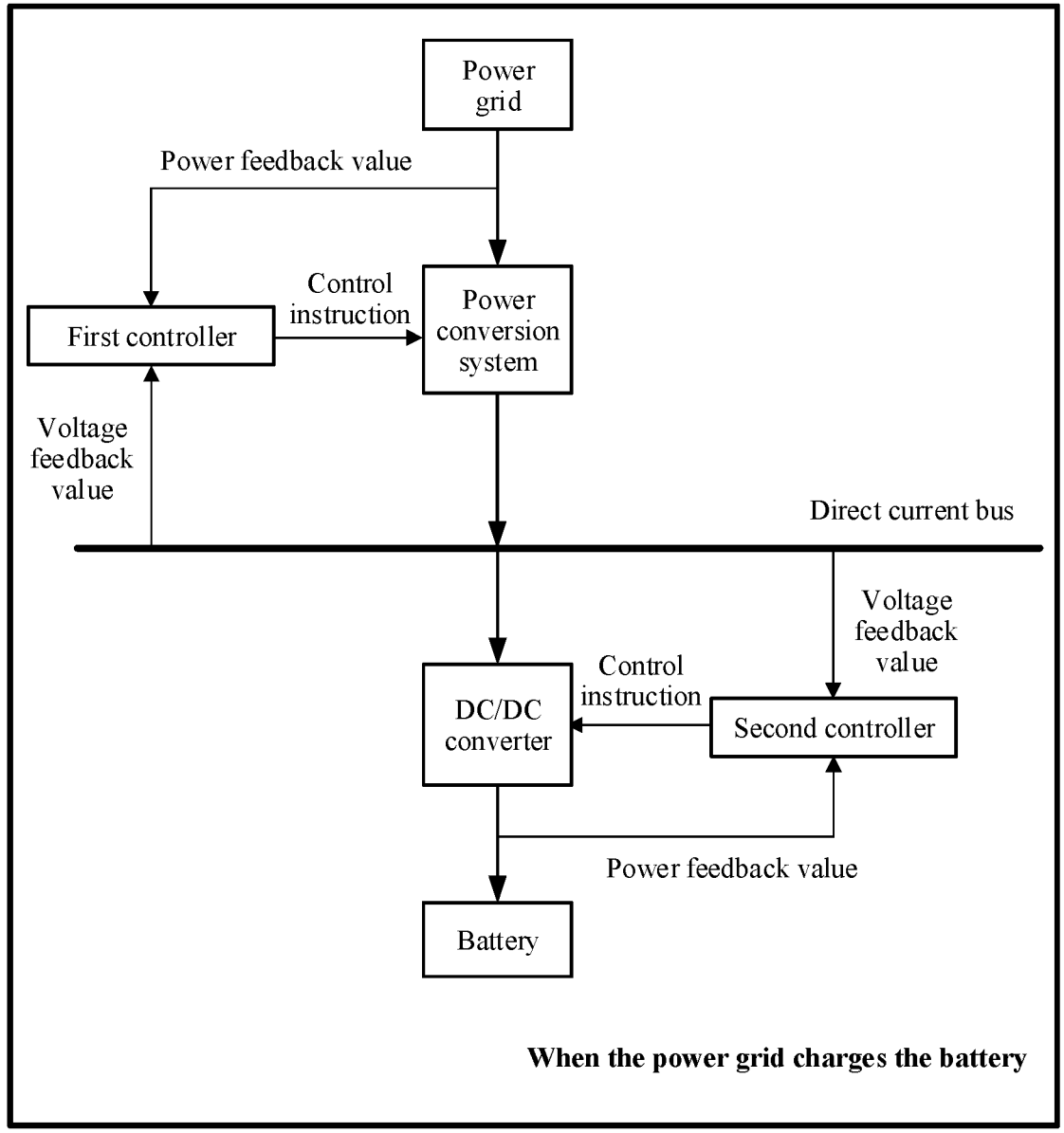
FIG. 2B is a schematic diagram of applying a power system to a scenario in which a power grid charges a battery according to this application.

With reference to FIG. 2A and FIG. 2B, the following provides examples of descriptions of cases in which the power system is applied to different scenarios.

FIG. 2A is a schematic diagram of applying a power system to a scenario in which a battery supplies power to a power grid or a load according to this application. As shown in FIG. 2A, the power system includes a battery, a power grid or a load, a power conversion system, a direct current bus, a DC/DC converter, and a controller. The controller includes a first controller and a second controller. The battery transmits power to the bus by using the DC/DC converter, the bus transmits power to the power grid or the load by using the power conversion system, and the controller is configured to control output power of the power conversion system and control input power of the DC/DC converter.

The controller is configured to adjust an output current of the first converter to a first current value based on a voltage of the direct current bus and a voltage threshold. A difference between an adjusted voltage of the direct current bus and the voltage threshold is less than a difference between the unadjusted voltage of the direct current bus and the voltage threshold.

The controller is further configured to adjust the output current of the first converter to a second current value based on the output power of the first converter and a power threshold. A difference between adjusted output power of the first converter and the power threshold is less than a difference between the unadjusted output power of the first converter and the power threshold.

The controller is further configured to adjust the output current of the first converter based on the first current value and the second current value.

Specifically, the controller may obtain a voltage feedback value and a power feedback value. To be specific, the first controller obtains the output power of the power conversion system and uses the output power of the power conversion system as the power feedback value, and obtains the voltage of the bus and uses the voltage of the bus as the voltage feedback value. The second controller obtains the input power of the DC/DC converter and uses the input power of the DC/DC converter as the power feedback value, and obtains the voltage of the bus and uses the voltage of the bus as the voltage feedback value. Further, the controller may separately determine control instructions for the power conversion system and the DC/DC converter based on the power feedback value and the voltage feedback value, to control the output power of the power conversion system and control the input power of the DC/DC converter. Specifically, the first controller may calculate the first current value based on the voltage of the bus and the voltage threshold. If the output current of the power conversion system is adjusted to the first current value, the difference between the adjusted voltage of the direct current bus and the voltage threshold is less than the difference between the unadjusted voltage of the direct current bus and the voltage threshold. The controller calculates the second current value based on the output power of the power conversion system and the power threshold. If the output current of the power conversion system is adjusted to the second current value, the difference between the adjusted output power of the first converter and the power threshold is less than the difference between the unadjusted output power of the first converter and the power threshold. The controller may adjust the output current of the power conversion system in real time based on the first current value and the second current value. The second controller may calculate a fourth current value based on the voltage of the bus and the voltage threshold, and adjust an input current of the DC/DC converter to the fourth current value. A difference between an adjusted voltage of the direct current bus and the voltage threshold is less than a difference between the unadjusted voltage of the direct current bus and the voltage threshold. The second controller may calculate a fifth current value based on the input power of the DC/DC converter and the power threshold, and adjust the input current of the DC/DC converter to the fifth current value. A difference between adjusted input power of the DC/DC converter and the power threshold is less than a difference between the unadjusted input power of the DC/DC converter and the power threshold. Further, the second controller may adjust the input current of the DC/DC converter based on the fourth current value and the fifth current value.

The controller may further include a detection unit, and the detection unit is configured to obtain the voltage of the bus, the output power of the power conversion system, and the input power of the DC/DC converter.

FIG. 2B is a schematic diagram of applying a power system to a scenario in which a power grid charges a battery according to this application. As shown in FIG. 2B, the power system includes a battery, a power grid, a power conversion system, a direct current bus, a DC/DC converter, and a controller. The controller includes a first controller and a second controller. The power grid transmits power to the bus by using the power conversion system, the bus transmits power to the battery by using the DC/DC converter, and the controller is configured to control input power of the power conversion system and control output power of the DC/DC converter.

The controller is configured to adjust an input current of the first converter to a first current value based on a voltage of the direct current bus and a voltage threshold. A difference between an adjusted voltage of the direct current bus and the voltage threshold is less than a difference between the unadjusted voltage of the direct current bus and the voltage threshold.

The controller is further configured to adjust the input current of the first converter to a second current value based on the input power of the first converter and the power threshold. A difference between adjusted input power of the first converter and the power threshold is less than a difference between the unadjusted input power of the first converter and the power threshold.

The controller is further configured to adjust the input current of the first converter based on the first current value and the second current value.

Specifically, the controller may obtain a voltage feedback value and a power feedback value. To be specific, the first controller obtains the input power of the power conversion system and uses the input power of the power conversion system as the power feedback value, and obtains the voltage of the bus and uses the voltage of the bus as the voltage feedback value. The second controller obtains the output power of the DC/DC converter and uses the output power of the DC/DC converter as the power feedback value, and obtains the voltage of the bus and uses the voltage of the bus as the voltage feedback value. Further, the controller may separately determine control instructions for the power conversion system and the DC/DC converter based on the voltage feedback value and the power feedback value, to control the input power of the power conversion system and control the output power of the DC/DC converter. Specifically, the first controller may calculate the first current value based on the voltage of the bus and the voltage threshold. If the input current of the power conversion system is adjusted to the first current value, the difference between the adjusted voltage of the direct current bus and the voltage threshold is less than the difference between the unadjusted voltage of the direct current bus and the voltage threshold. The controller determines the second current value based on the input power of the power conversion system and the power threshold. If the input current of the power conversion system is adjusted to the second current value, the difference between the adjusted input power of the power conversion system and the power threshold is less than the difference between the unadjusted input power of the power conversion system and the power threshold. The second controller may adjust the input or output current of the power conversion system in real time based on the first current value and the second current value. The first controller may determine a fourth current value based on the voltage of the bus and the voltage threshold. If an output current of the DC/DC converter is adjusted to the fourth current value, a difference between an adjusted voltage of the direct current bus and the voltage threshold is less than a difference between the unadjusted voltage of the direct current bus and the voltage threshold. The first controller may determine a fifth current value based on the output power of the DC/DC converter and the power threshold. If the output current of the DC/DC converter is adjusted to the fifth current value, a difference between adjusted output power of the DC/DC converter and the power threshold is less than a difference between the unadjusted output power of the DC/DC converter and the power threshold. The first controller may adjust the output current of the DC/DC converter based on the fourth current value and the fifth current value.

The controller may further include a detection unit, and the detection unit is configured to obtain the voltage of the bus, the input power of the power conversion system, and the output power of the DC/DC converter.

It may be understood that the architecture of the power system in FIG. 1, FIG. 2A, or FIG. 2B is merely an example implementation in embodiments of this application, and an architecture of a power system in embodiments of this application includes but is not limited to the foregoing architecture of the power system.

The controller may be a processor, or may be a general term of a plurality of processing elements. For example, the processor may be a general central processing unit (CPU), or may be an application-specific integrated circuit (ASIC), or one or more integrated circuits configured to control execution for a program of a solution of this application, for example, one or more micro-processors (DSP) or one or more field programmable gate arrays (FPGA). In a specific implementation, in an embodiment, the processor 40 may include one or more CPUs. For another example, the controller may be a proportional-integral-derivative (proportional-integral-derivative control) controller or another controller.

The system may further include a memory. The memory may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (Compact Disc Read-Only Memory, CD-ROM), another optical disk storage, an optical disc storage (including a compact disc, a laser disc, an optical disc, a digital versatile disc, a Blu-ray disc, and the like), a disk storage medium, another magnetic storage device, or any other medium that can be used to carry or store expected program code in a form of an instruction or a data structure and that can be accessed by a computer. However, this is not limited thereto. The memory may exist independently. Alternatively, the memory may be integrated with the controller.

In this embodiment of this application, the memory is further configured to store application code for executing the solution of this application, and the controller controls the execution. In other words, the controller is configured to execute the application code stored in the memory.

It should be noted that FIG. 1, FIG. 2A, or FIG. 2B does not constitute a specific limitation on the power system in embodiments of this application. In some other embodiments of this application, the power system may include more or fewer modules than those shown in the figure, or combine some modules, or split some modules, or have different module arrangements.

With reference to FIG. 3 to FIG. 7, the following describes examples of a controller and a control method that are provided in this application. The controller and the control method in embodiments of this application may be applied to the power system in FIG. 1, FIG. 2A, and FIG. 2B, to control output power of the power system and stabilize a voltage of a bus.

Figure 3:
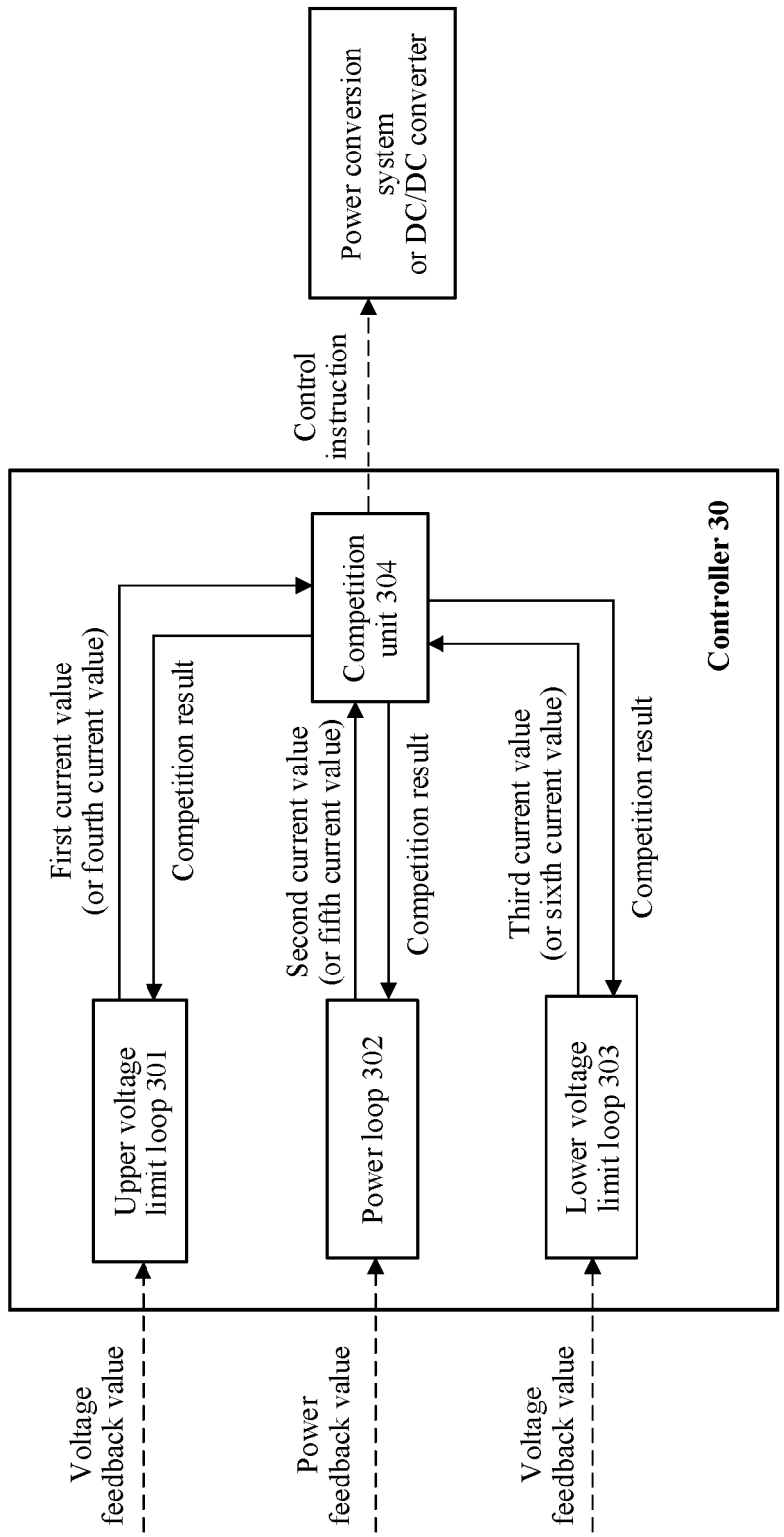
FIG. 3 is a schematic diagram of a controller 30 according to an embodiment of this application.

FIG. 3 is a schematic diagram of a controller 30 according to an embodiment of this application. As shown in FIG. 3, the controller 30 includes an upper voltage limit loop 301, a lower voltage limit loop 303, a power loop 302, and a contention unit 304. Specifically, the upper voltage limit loop 301 and the lower voltage limit loop 303 are configured to: obtain a voltage of a bus and use the voltage of the bus as a voltage feedback value, and receive a contention result of previous contention from the contention unit 304. The power loop 302 is configured to: receive input power or output power of a converter and use the input power or the output power of the converter as a power feedback value, and receive a contention result of previous contention from the contention unit 304. Further, the upper voltage limit loop 301, the power loop 302, and the lower voltage limit loop 303 are separately configured to: generate current values, and send the generated current values to the contention unit 304. The contention unit 304 is configured to: determine a current value and a contention result for the converter according to a preset contention rule, send a control instruction to the converter to adjust a current value of the converter, and feed back the contention result to the upper voltage limit loop 301, the lower voltage limit loop 303, and the power loop 302. The upper voltage limit loop 301, the power loop 302, and the lower voltage limit loop 303 may be a proportional-integral-derivative controller 30, or may be another controller 30. This is not limited herein.

It should be noted that FIG. 3 does not constitute a specific limitation on the controller 30 in this embodiment of this application. In some other embodiments of this application, the controller 30 may include more or fewer units than those shown in the figure, or combine some units, or split some units, or have different unit arrangements. For example, the controller 30 may include only the upper voltage limit loop 301 and the lower voltage limit loop 303. For another example, the controller 30 may include only the power loop 302. The components shown in the figure may be implemented by hardware, software, or a combination of software and hardware.

With reference to FIG. 2A and FIG. 3, the following describes examples of an embodiment of applying a controller to a power system in which a battery supplies power to a power grid or a load.

The following describes a specific implementation in which a first controller controls a first converter.

In some embodiments, the controller includes an upper voltage limit loop and a power loop. A voltage threshold that is preset in the upper voltage limit loop is an upper limit of a voltage of a bus. Specifically, the upper voltage limit loop is configured to determine a first current value based on the voltage of the bus and the upper limit. When an output current of the first converter is equal to the first current value, the voltage of the bus approaches the upper limit. The power loop is configured to determine a second current value based on output power of the first converter and a power threshold. When the output current of the first converter is equal to the second current value, the output power of the first converter approaches the power threshold. A contention unit is configured to: determine a larger current value in the first current value and the second current value as a target current value, and determine a contention result between the upper voltage limit loop and the power loop. If the target current value is the first current value, the upper voltage limit loop succeeds in contention; or if the target current value is the second current value, the power loop succeeds in contention.

For example, an initial state of the power system is that the voltage of the bus is a proper value (in other words, the voltage of the bus falls between the upper limit and a lower limit), and the output power of the first converter exceeds the power threshold (or the power grid requires that the output power of the first converter should decrease or the power threshold becomes smaller). It is assumed that the output current of the first converter in this case is q, and the voltage of the bus is the upper limit when the current value of the first converter is q'. It may be understood that when the battery supplies power to the power grid, if the output current of the first converter decreases, the output power of the first converter decreases, and the voltage of the bus increases.

The upper voltage limit loop is configured to: when it is determined that the voltage of the bus is less than the upper limit, determine the first current value q1, where q1 is less than q, so that the voltage of the bus increases. In addition, because the first current value enables the voltage of the bus to approach the upper limit, in other words, the first current value enables the voltage of the bus to be less than or equal to the upper limit, q1 is greater than q', in other words, voltages of the bus when currents greater than q1 are applied to the first converter are less than the upper limit.

The power loop is configured to: when it is determined that the output power of the first converter exceeds the power threshold, determine the second current value q2, where q2 is less than q, so that the output power decreases.

The contention unit is configured to: when the second current value q2 is greater than the first current value q1, determine that the power loop succeeds in contention, and adjust the output current of the first converter to the second current value, to meet an output power requirement of the power grid when the voltage of the bus is a proper value. It may be understood that if q2 is greater than q1, the voltage of the bus is not less than the upper limit when q2 is applied to the converter, and the contention unit may determine that the power loop succeeds in contention, to meet the output power requirement of the power grid when the voltage of the bus is a proper value.

The contention unit is further configured to: when the second current value q2 is less than the first current value q1, determine that the upper voltage limit loop succeeds in contention, and adjust the output current of the first converter to the first current value, to ensure that the voltage of the bus is less than the upper limit. It may be understood that if q2 is less than q1, it is uncertain whether the voltage of the bus is less than the upper limit when q2 is applied to the converter, the contention unit may determine that the upper voltage limit loop succeeds in contention, and it is preferential to ensure that the voltage of the bus is less than the upper limit without considering a requirement of adjusting power.

It can be learned from the foregoing descriptions that the contention unit may determine a larger current value in the first current value and the second current value as the target current value, and adjust the output current value of the first converter to the target current value, to ensure that the voltage of the bus is less than the upper limit and to meet the power requirement of the power grid when the voltage of the bus is less than the upper limit of the voltage of the bus.

Further, after the upper voltage limit loop obtains a result of previous contention, the upper voltage limit loop is further configured to: when the upper voltage limit loop succeeds in previous contention, determine the first current value based on a proportion, an integral, and a derivative of a deviation between the voltage of the bus and the upper limit; or when the upper voltage limit loop fails in previous contention, determine the first current value based on a proportion of a deviation between the voltage of the bus and the upper limit.

Further, after the power loop obtains a result of previous contention, the power loop is further configured to: when the power loop succeeds in previous contention, determine the second current value based on a proportion, an integral, and a derivative of a deviation between the output power of the first converter and the power threshold; or when the power loop fails in previous contention, determine the second current value based on a proportion of a deviation between the output power of the first converter and the power threshold. It may be understood that the upper voltage limit loop and the power loop may be a proportional-integral-derivative controller or another controller to implement the foregoing functions.

Assuming that the first current value q1 is greater than the second current value q2 in previous contention, after the contention unit determines that the upper voltage limit loop succeeds in contention and the power loop obtains a result of a contention failure, the power loop determines the second current value based on the proportion of the deviation between the output power of the first converter and the power threshold. In this case, the power loop is in a locked state, and the power loop stabilizes q2 at a value slightly less than a current value existing when the power loop fails in contention. The upper voltage limit loop constantly decreases q1 to increase the voltage of the bus, so that the voltage of the bus approaches the upper limit.

Assuming that in previous contention, the first current value q1 is greater than the second current value q2 and both q1 and q2 are greater than q', when q1 constantly decreases and is less than q2, the power loop is used through switching to control power. Because the power loop stabilizes q2 at a value slightly less than a current value existing when the power loop fails in contention, when switching is performed from the upper voltage limit loop to the power loop, the contention unit may use q2 as the output current of the first converter in a short period of time to control power. Therefore, stability of the voltage of the bus can be ensured in the process of performing switching from the upper voltage limit loop to the power loop by the controller.

Assuming that in previous contention, the first current value q1 is greater than the second current value q2 and q2 is less than q', the contention unit determines that the upper voltage limit loop succeeds in contention, and the upper voltage limit loop adjusts the output current of the first converter, so that the output current of the first converter is greater than or equal to q', in other words, the voltage of the bus is stabilized at a value less than or equal to the upper limit.

In some other embodiments, the controller includes a lower voltage limit loop and a power loop. A voltage threshold that is preset in the lower voltage limit loop is a lower limit of a voltage of a bus. Specifically, the lower voltage limit loop is configured to determine a third current value based on the voltage of the bus and the lower limit. A contention unit is configured to: determine a smaller current value in a second current value and the third current value as a target current value, and determine a contention result between the lower voltage limit loop and the power loop. If the target current value is the third current value, the lower voltage limit loop succeeds in contention; or if the target current value is the second current value, the power loop succeeds in contention.

For example, an initial state of the power system is that the voltage of the bus is a proper value (in other words, the voltage of the bus falls between an upper limit and the lower limit), and output power of the first converter is less than a power threshold (or the power grid requires that the output power of the first converter should increase or the power threshold becomes larger). It is assumed that an output current of the first converter in this case is q, and the voltage of the bus is the lower limit when the current value of the first converter is q'. It may be understood that when the battery supplies power to the power grid, if the output current of the first converter increases, the output power of the first converter increases, and the voltage of the bus decreases.

The lower voltage limit loop is configured to: when it is determined that the voltage of the bus is greater than the lower limit, determine a third current value q3, where q3 is greater than q, so that the voltage of the bus decreases. In addition, because the third current value enables the voltage of the bus to approach the lower limit, in other words, the third current value enables the voltage of the bus to be greater than or equal to the lower limit, that is, the third current value does not enable the voltage of the bus to be less than the lower limit, q1 is greater than q'. It can be learned that the voltage of the bus when a current value less than q1 is applied to the output power of the first converter is greater than the lower limit.

The power loop is configured to: when it is determined that the output power of the first converter is less than the power threshold, determine the second current value q2, where q2 is greater than q, so that the output power increases.

The contention unit is configured to: when the second current value q2 is less than the third current value q1, determine that the power loop succeeds in contention, and adjust the output current of the first converter to the second current value, to meet an output power requirement of the power grid when the voltage of the bus is a proper value. It may be understood that if q2 is less than q1, the voltage of the bus is not less than the lower limit when q2 is applied to the converter, the contention unit may determine that the power loop succeeds in contention, to meet the output power requirement of the power grid when the voltage of the bus is a proper value.

The contention unit is further configured to: when the second current value q2 is greater than the third current value q1, determine that the lower voltage limit loop succeeds in contention, and adjust the output current of the first converter to the third current value, to ensure that the voltage of the bus is less than the lower limit. It may be understood that if q2 is greater than q1, it is uncertain whether the voltage of the bus is less than the lower limit when q2 is applied to the converter, the contention unit may determine that the lower voltage limit loop succeeds in contention, and it is preferential to ensure that the voltage of the bus is less than the lower limit without considering a requirement of adjusting power.

It can be learned from the foregoing descriptions that the contention unit may determine a smaller current value in the third current value and the second current value as the target current value, and adjust the output current value of the first converter to the target current value, to ensure that the voltage of the bus is less than the lower limit and to meet the power requirement of the power grid when the voltage of the bus is less than the lower limit of the voltage of the bus.

Further, after the lower voltage limit loop obtains a result of previous contention, the lower voltage limit loop is further configured to: when the lower voltage limit loop succeeds in previous contention, determine the third current value based on a proportion, an integral, and a derivative of a deviation between the voltage of the bus and the lower limit; or when the lower voltage limit loop fails in previous contention, determine the third current value based on a proportion of a deviation between the voltage of the bus and the lower limit.

Assuming that the second current value q2 is greater than the third current value q1 in previous contention, after the contention unit determines that the lower voltage limit loop succeeds in contention and the power loop obtains a result of a contention failure, the power loop determines the second current value based on a proportion of a deviation between the output power of the first converter and the power threshold. In this case, the power loop is in a locked state, and the power loop stabilizes q2 at a value slightly greater than a current value existing when the power loop fails in contention. The lower voltage limit loop constantly decreases q1 to decrease the voltage of the bus, so that the voltage of the bus approaches the lower limit.

Assuming that in previous contention, the second current value q2 is greater than the third current value q1 and both q1 and q2 are greater than q', when q1 constantly increase and is greater than q2, the power loop is used through switching to control power. Because the power loop stabilizes q2 at a value slightly greater than a current value existing when the power loop fails in contention, when switching is performed from the lower voltage limit loop to the power loop, the contention unit may use q2 as the output current of the first converter in a short period of time to control power. Therefore, stability of the voltage of the bus can be ensured in the process of performing switching from the lower voltage limit loop to the power loop by the controller.

Assuming that in previous contention, the second current value q2 is greater than the third current value q1 and q2 is less than q', finally, the lower limit loop of the voltage of the bus controls the voltage of the bus to be less than or equal to the lower limit.

The following describes a specific implementation in which a second controller controls a second converter.

In some embodiments, the controller includes an upper voltage limit loop and a power loop. A voltage threshold that is set in the upper voltage limit loop is an upper limit of a voltage of a bus. The upper voltage limit loop is configured to determine a fourth current value based on the voltage of the bus and the upper limit. When an input current of the second converter is equal to the fourth current value, the voltage of the bus approaches the upper limit. The power loop is configured to determine a fifth current value based on input power of the second converter and a power threshold. When the input current of the second converter is equal to the fifth current value, the input power of the second converter approaches the power threshold. The controller may further include a contention unit. The contention unit is configured to: determine a smaller current value in the fourth current value and the fifth current value as a target current value, and determine a contention result between the upper voltage limit loop and the power loop. If the target current value is the fourth current value, the upper voltage limit loop succeeds in contention; or if the target current value is the fifth current value, the power loop succeeds in contention.

Further, after the upper voltage limit loop obtains a result of previous contention, the upper voltage limit loop is further configured to: when the upper voltage limit loop succeeds in previous contention, determine the fourth current value based on a proportion, an integral, and a derivative of a deviation between the voltage of the bus and the upper limit; or when the upper voltage limit loop fails in previous contention, determine the fourth current value based on a proportion of a deviation between the voltage of the bus and the upper limit.

Further, after the power loop obtains a result of previous contention, the power loop is further configured to: when the power loop succeeds in previous contention, determine the fifth current value based on a proportion, an integral, and a derivative of a deviation between the input power of the second converter and the power threshold; or when the power loop fails in previous contention, determine the fifth current value based on a proportion of a deviation between the input power of the second converter and the power threshold.

For example, when the voltage of the bus is a proper value, the power loop controls the input current of the second converter, and the power loop is configured to determine the fifth current value based on the proportion, the integral, and the derivative of the deviation between the input power of the second converter and the power threshold; and the upper voltage limit loop is configured to determine the fourth current value based on the proportion of the deviation between the voltage of the bus and the upper limit. When the voltage of the bus increases because the power grid requires that output power of a first converter should decrease, the fourth current value determined by the upper voltage limit loop decreases. When the fourth current value decreases and is less than the fifth current value, the contention unit determines that the upper voltage limit loop succeeds in contention, and the upper voltage limit loop controls the input current of the second converter, to ensure that the voltage of the bus does not exceed the upper limit.

In some other embodiments, the controller may further include a lower voltage limit loop. A voltage threshold that is set in the lower voltage limit loop is a lower limit of the voltage of the bus. The lower voltage limit loop is configured to determine a sixth current value based on the voltage of the bus and the lower limit. The contention unit is configured to: determine a larger current value in the sixth current value and the fifth current value as a target current value, and determine a contention result between the lower voltage limit loop and the power loop. If the target current value is the sixth current value, the lower voltage limit loop succeeds in contention; or if the target current value is the fifth current value, the power loop succeeds in contention.

Further, after the lower voltage limit loop obtains a result of previous contention, the lower voltage limit loop is further configured to: when the lower voltage limit loop succeeds in previous contention, determine the sixth current value based on a proportion, an integral, and a derivative of a deviation between the voltage of the bus and the lower limit; or when the lower voltage limit loop fails in previous contention, determine the sixth current value based on a proportion of a deviation between the voltage of the bus and the lower limit.

For example, when the voltage of the bus is a proper value, the power loop controls the input current of the second converter, and the power loop is configured to determine the fifth current value based on the proportion, the integral, and the derivative of the deviation between the input power of the second converter and the power threshold; and the lower voltage limit loop is configured to determine the sixth current value based on the proportion of the deviation between the voltage of the bus and the lower limit. When the voltage of the bus decreases because the power grid requires that the output power of the first converter should increase, the sixth current value determined by the lower voltage limit loop increases. When the sixth current value increases and is greater than the fifth current value, the contention unit determines that the lower voltage limit loop succeeds in contention, and the lower voltage limit loop controls the input current of the second converter, to ensure that the voltage of the bus is not less than the lower limit.

It should be noted that when the controller includes the upper voltage limit loop, the power loop, and the lower voltage limit loop, the controller compares current values determined by the upper voltage limit loop, the power loop, and the lower voltage limit loop based on the foregoing content, and determines, from the upper voltage limit loop, the power loop, and the lower voltage limit loop, a current value applied to the second converter. For detailed content, refer to the foregoing related content. Details are not described herein again.

With reference to FIG. 2A and FIG. 3, the following describes examples of an embodiment of applying a controller to a power system in which a power grid charges a battery.

The following describes a specific implementation in which a first controller controls input power of a first converter.

In some embodiments, the controller includes an upper voltage limit loop and a power loop. A voltage threshold that is preset in the upper voltage limit loop is an upper limit of a voltage of a bus. Specifically, the upper voltage limit loop is configured to determine a first current value based on the voltage of the bus and the upper limit. The power loop is configured to determine a second current value based on the input power of the first converter and a power threshold. When an input current of the first converter is equal to the second current value, the input power of the first converter approaches the power threshold. The controller is configured to: determine a smaller current value in the first current value and the second current value as a target current value, and determine a contention result between the upper voltage limit loop and the power loop. If the target current value is the first current value, the upper voltage limit loop succeeds in contention; or if the target current value is the second current value, the power loop succeeds in contention.

Further, after the upper voltage limit loop obtains a result of previous contention, the upper voltage limit loop is further configured to: when the upper voltage limit loop succeeds in previous contention, determine the first current value based on a proportion, an integral, and a derivative of a deviation between the voltage of the bus and the upper limit; or when the upper voltage limit loop fails in previous contention, determine the first current value based on a proportion of a deviation between the voltage of the bus and the upper limit.

Further, after the power loop obtains a result of previous contention, the power loop is further configured to: when the power loop succeeds in previous contention, determine the second current value based on a proportion, an integral, and a derivative of a deviation between the input power of the first converter and the power threshold; or when the power loop fails in previous contention, determine the second current value based on a proportion of a deviation between the input power of the first converter and the power threshold.

For example, when the voltage of the bus is a proper value, the power loop controls the input current of the first converter, and the power loop is configured to determine the second current value based on the proportion, the integral, and the derivative of the deviation between the input power of the first converter and the power threshold; and the upper voltage limit loop is configured to determine the first current value based on the proportion of the deviation between the voltage of the bus and the upper limit. When the voltage of the bus increases because the power grid requires that output power of the first converter should decrease, the first current value determined by the upper voltage limit loop decreases. When the first current value decreases and is less than the second current value, a contention unit determines that the upper voltage limit loop succeeds in contention, and the upper voltage limit loop controls the input current of the first converter, to ensure that the voltage of the bus does not exceed the upper limit.

In some other embodiments, the controller includes a lower voltage limit loop and a power loop. A voltage threshold that is preset in the upper voltage limit loop is a lower limit of a voltage of a bus. Specifically, the lower voltage limit loop is configured to determine a third current value based on the voltage of the bus and the lower limit. The controller is configured to: determine a larger current value in a second current value and the third current value as a target current value, and determine a contention result between the lower voltage limit loop and the power loop. If the target current value is the third current value, the lower voltage limit loop succeeds in contention; or if the target current value is the second current value, the power loop succeeds in contention.

Further, after the lower voltage limit loop obtains a result of previous contention, the lower voltage limit loop is further configured to determine the third current value based on the voltage of the bus and the voltage threshold, including: when the lower voltage limit loop succeeds in previous contention, determining the third current value based on a proportion, an integral, and a derivative of a deviation between the voltage of the bus and the lower limit; or when the lower voltage limit loop fails in contention, determining the third current value based on a proportion of a deviation between the voltage of the bus and the lower limit.

For example, when the voltage of the bus is a proper value, the power loop controls an input current of a second converter, and the power loop is configured to determine the second current value based on a proportion, an integral, and a derivative of a deviation between the input power of the first converter and the power threshold; and the lower voltage limit loop is configured to determine the third current value based on the proportion of the deviation between the voltage of the bus and the lower limit. When the voltage of the bus decreases because the power grid requires that output power of the first converter should increase, the third current value determined by the lower voltage limit loop increases. When the third current value increases and is greater than the second current value, a contention unit determines that the lower voltage limit loop succeeds in contention, and the lower voltage limit loop controls the input current of the second converter, to ensure that the voltage of the bus is not less than the lower limit.

The following describes a specific implementation in which a second controller controls a second converter.

The power system further includes the second converter and the battery. A bus transmits power to the battery by using the second converter, and the controller is further configured to control output power of the second converter. The controller is configured to determine a fourth current value based on a voltage of the bus and a voltage threshold. When an output current of the second converter is equal to the fourth current value, the voltage of the bus approaches the voltage threshold. The controller is further configured to determine a fifth current value based on the output power of the second converter and a power threshold. When the output current of the second converter is equal to the fifth current value, the output power of the second converter approaches the power threshold. The controller is further configured to determine a target current value of the second converter from the fourth current value and the fifth current value. The controller is further configured to adjust the output current of the second converter, so that the output current of the second converter is equal to the target current value.

In some embodiments, the controller includes an upper voltage limit loop and a power loop. A voltage threshold that is preset in the upper voltage limit loop is an upper limit of the voltage of the bus. Specifically, the upper voltage limit loop is configured to determine the fourth current value based on the voltage of the bus and the upper limit. The power loop is configured to determine the fifth current value based on the output power of the fourth converter and the power threshold. When the output current of the fourth converter is equal to the fifth current value, the output power of the fourth converter approaches the power threshold. The controller is configured to: determine a larger current value in the fourth current value and the fifth current value as a target current value, and determine a contention result between the upper voltage limit loop and the power loop. If the target current value is the fourth current value, the upper voltage limit loop succeeds in contention; or if the target current value is the fifth current value, the power loop succeeds in contention.

Further, after the upper voltage limit loop obtains a result of previous contention, the upper voltage limit loop is further configured to: when the upper voltage limit loop succeeds in previous contention, determine the fourth current value based on a proportion, an integral, and a derivative of a deviation between the voltage of the bus and the upper limit; or when the upper voltage limit loop fails in previous contention, determine the fourth current value based on a proportion of a deviation between the voltage of the bus and the upper limit.

Further, after the power loop obtains a result of previous contention, the power loop is further configured to: when the power loop succeeds in previous contention, determine the fifth current value based on a proportion, an integral, and a derivative of a deviation between the output power of the second converter and the power threshold; or when the power loop fails in previous contention, determine the fifth current value based on a proportion of a deviation between the output power of the second converter and the power threshold.

For example, when the voltage of the bus is a proper value, the power loop controls the output current of the second converter. When the voltage of the bus increases because the power grid requires that output power of a first converter should decrease, the fourth current value determined by the upper voltage limit loop based on the proportion of the deviation between the voltage of the bus and the upper limit constantly increases. When the fourth current value increases and is greater than the fifth current value, a contention unit determines that the upper voltage limit loop succeeds in contention, and the upper voltage limit loop controls the output current of the second converter, to ensure that the voltage of the bus is not greater than the upper limit.

In some other embodiments, the controller includes a lower voltage limit loop and a power loop. A voltage threshold that is preset in the upper voltage limit loop is a lower limit of the voltage of the bus. Specifically, the lower voltage limit loop is configured to determine a sixth current value based on the voltage of the bus and the lower limit. The controller is configured to: determine a smaller current value in the sixth current value and a fifth current value as a target current value, and determine a contention result between the lower voltage limit loop and the power loop. If the target current value is the sixth current value, the lower voltage limit loop succeeds in contention; or if the target current value is the fifth current value, the power loop succeeds in contention.

Further, after the lower voltage limit loop obtains a result of previous contention, the lower voltage limit loop is further configured to: when the lower voltage limit loop succeeds in previous contention, determine the sixth current value based on a proportion, an integral, and a derivative of a deviation between the voltage of the bus and the lower limit; or when the lower voltage limit loop fails in previous contention, determine the sixth current value based on a proportion of a deviation between the voltage of the bus and the lower limit.

For example, when the voltage of the bus is a proper value, the power loop controls the output current of the second converter. When the voltage of the bus decreases because the power grid requires that output power of a first converter should increase, the sixth current value determined by the lower voltage limit loop based on the proportion of the deviation between the voltage of the bus and the lower limit constantly decreases. When the sixth current value decreases and is less than the fifth current value, a contention unit determines that the lower voltage limit loop succeeds in contention, and the lower voltage limit loop controls the output current of the second converter, to ensure that the voltage of the bus is not less than the lower limit.

It should be noted that when the controller includes the upper voltage limit loop, the power loop, and the lower voltage limit loop, the controller compares current values determined by the upper voltage limit loop, the power loop, and the lower voltage limit loop based on the foregoing content, and determines, from the upper voltage limit loop, the power loop, and the lower voltage limit loop, a current value applied to the converter. For detailed content, refer to the foregoing related content. Details are not described herein again.

It should be noted that for a principle of the embodiment of applying the controller to the power system in which the power grid charges the battery, refer to related descriptions of a principle of the embodiment of applying the controller to the power system in which the battery supplies power to the power grid or the load. Details are not described herein again.

FIG. 4 is a flowchart of a control method according to an embodiment of this application. The method may be applied to the power system shown in FIG. 1, and the power system runs in the scenario shown in FIG. 2A. The method may be performed by a controller, and the method may include some or all of the following operations.

S401: Calculate a first current value based on a voltage of a bus and a voltage threshold, where if an output current of a first converter is adjusted to the first current value, a difference between an adjusted voltage of the direct current bus and the voltage threshold is less than a difference between the unadjusted voltage of the direct current bus and the voltage threshold.

The controller may include an upper voltage limit loop and/or a lower voltage limit loop, and this operation may be performed by the upper voltage limit loop or the lower voltage limit loop shown in FIG. 3.

In some embodiments, when the upper voltage limit loop succeeds in previous contention, the controller may further determine the first current value based on a proportion, an integral, and a derivative of a deviation between the voltage of the bus and an upper limit; or when the upper voltage limit loop fails in previous contention, the controller may further determine the first current value based on a proportion of a deviation between the voltage of the bus and an upper limit.

In some other embodiments, when the lower voltage limit loop succeeds in previous contention, the controller may determine a third current value based on a proportion, an integral, and a derivative of a deviation between the voltage of the bus and a lower limit; or when the lower voltage limit loop fails in previous contention, the controller may determine a third current value based on a proportion of a deviation between the voltage of the bus and a lower limit.

It should be noted that for a specific process of operation S401, refer to related content described in FIG. 1 to FIG. 3. Details are not described herein again.

S402: Calculate a second current value based on output power of the first converter and a power threshold, where if the output current of the first converter is adjusted to the second current value, a difference between adjusted output power of the first converter and the power threshold is less than a difference between the unadjusted output power of the first converter and the power threshold.

This operation may be performed by the power loop shown in FIG. 3.

In some embodiments, when the power loop succeeds in previous contention, the controller may further determine the second current value based on a proportion, an integral, and a derivative of a deviation between the output power of the first converter and the power threshold; or when the power loop fails in previous contention, the controller may further determine the second current value based on a proportion of a deviation between the output power of the first converter and the power threshold.

It should be noted that for a process of operation S402, refer to related content described in FIG. 1 to FIG. 3. Details are not described herein again.

S403: Adjust the output current of the first converter based on the first current value and the second current value.

In some embodiments, when the first current value is a current value determined by the upper voltage limit loop, the controller may determine a larger current value in the first current value and the second current value as a target current value, and determine a contention result between the upper voltage limit loop and the power loop. If the target current value is the first current value, the upper voltage limit loop succeeds in contention; or if the target current value is the second current value, the power loop succeeds in contention. Further, the controller may separately feed back the contention result between the upper voltage limit loop and the power loop to the upper voltage limit loop and the power loop.

In some other embodiments, when the first current value is a current value determined by the limit loop, the controller may determine a smaller current value in the second current value and the third current value as a target current value, and determine a contention result between the lower voltage limit loop and the power loop. If the target current value is the third current value, the lower voltage limit loop succeeds in contention; or if the target current value is the second current value, the power loop succeeds in contention. Further, the controller may separately feed back the contention result between the lower voltage limit loop and the power loop to the lower voltage limit loop and the power loop.

Further, the controller may send a control instruction to the first converter. The control instruction is used to instruct to adjust the output current of the first converter, so that the output current of the first converter is equal to the target current value.

It should be noted that for a specific process of operation S403, refer to related content described in FIG. 1 to FIG. 3. Details are not described herein again.

FIG. 5 is a flowchart of another control method according to an embodiment of this application. The method may be applied to the power system shown in FIG. 1, and the power system runs in the scenario shown in FIG. 2A. The method may be performed by a controller, and the method may include some or all of the following operations.

S501: Calculate a fourth current value based on a voltage of a bus and a voltage threshold, where if an input current of a second converter is adjusted to the fourth current value, a difference between an adjusted voltage of the direct current bus and the voltage threshold is less than a difference between the unadjusted voltage of the direct current bus and the voltage threshold.

The controller may include an upper voltage limit loop and/or a lower voltage limit loop, and this operation may be performed by the upper voltage limit loop or the lower voltage limit loop shown in FIG. 3.

In some embodiments, when the upper voltage limit loop succeeds in previous contention, the controller may further determine the fourth current value based on a proportion, an integral, and a derivative of a deviation between the voltage of the bus and an upper limit; or when the upper voltage limit loop fails in previous contention, the controller may further determine the fourth current value based on a proportion of a deviation between the voltage of the bus and an upper limit.

In some other embodiments, when the lower voltage limit loop succeeds in previous contention, the controller may determine a sixth current value based on a proportion, an integral, and a derivative of a deviation between the voltage of the bus and a lower limit; or when the lower voltage limit loop fails in previous contention, the controller may determine a sixth current value based on a proportion of a deviation between the voltage of the bus and a lower limit.

It should be noted that for a specific process of operation S501, refer to related content described in FIG. 1 to FIG. 3. Details are not described herein again.

S502: Calculate a fifth current value based on input power of the second converter and a power threshold, where if the input current of the second converter is adjusted to the fifth current value, a difference between adjusted input power of the second converter and the power threshold is less than a difference between the unadjusted input power of the second converter and the power threshold.

This operation may be performed by the power loop shown in FIG. 3.

In some embodiments, when the power loop succeeds in previous contention, the controller may further determine the fifth current value based on a proportion, an integral, and a derivative of a deviation between the input power of the second converter and the power threshold; or when the power loop fails in previous contention, the controller may further determine the fifth current value based on a proportion of a deviation between the input power of the second converter and the power threshold.

It should be noted that for a process of operation S502, refer to related content described in FIG. 1 to FIG. 3. Details are not described herein again.

S503: Adjust the input current of the second converter based on the fourth current value and the fifth current value.

In some embodiments, when a fourth current value is a current value determined by the upper voltage limit loop, the controller may determine a smaller current value in the fourth current value and the fifth current value as a target current value, and determine a contention result between the upper voltage limit loop and the power loop. If the target current value is the fourth current value, the upper voltage limit loop succeeds in contention; or if the target current value is the fifth current value, the power loop succeeds in contention. Further, the controller may separately feed back the contention result between the upper voltage limit loop and the power loop to the upper voltage limit loop and the power loop.

In some other embodiments, when a first current value is a current value determined by the upper voltage limit loop, the controller may determine a larger current value in the sixth current value and the fifth current value as a target current value, and determine a contention result between the lower voltage limit loop and the power loop. If the target current value is the sixth current value, the lower voltage limit loop succeeds in contention; or if the target current value is the fifth current value, the power loop succeeds in contention. Further, the controller may separately feed back the contention result between the lower voltage limit loop and the power loop to the lower voltage limit loop and the power loop.

Further, the controller may send a control instruction to a second converter. The control instruction is used to instruct to adjust the input current of the second converter, so that the input current of the second converter is equal to the target current value.

It should be noted that for a process in which the controller determines a second current, refer to related content described in FIG. 1 to FIG. 3. Details are not described herein again.

FIG. 6 is a flowchart of still another control method according to an embodiment of this application. The method may be applied to the power system shown in FIG. 1, and the power system runs in the scenario shown in FIG. 2B. The method may be performed by a controller, and the method may include some or all of the following operations.

S601: Calculate a first current value based on a voltage of a bus and a voltage threshold, where if an input current of a first converter is adjusted to the first current value, a difference between an adjusted voltage of the direct current bus and the voltage threshold is less than a difference between the unadjusted voltage of the direct current bus and the voltage threshold.

The controller may include an upper voltage limit loop and/or a lower voltage limit loop, and this operation may be performed by the upper voltage limit loop or the lower voltage limit loop shown in FIG. 3.

In some embodiments, when the upper voltage limit loop succeeds in previous contention, the controller may further determine the first current value based on a proportion, an integral, and a derivative of a deviation between the voltage of the bus and an upper limit; or when the upper voltage limit loop fails in previous contention, the controller may further determine the first current value based on a proportion of a deviation between the voltage of the bus and an upper limit.

In some other embodiments, when the lower voltage limit loop succeeds in previous contention, the controller may determine a third current value based on a proportion, an integral, and a derivative of a deviation between the voltage of the bus and a lower limit; or when the lower voltage limit loop fails in previous contention, the controller may determine a third current value based on a proportion of a deviation between the voltage of the bus and a lower limit.

It should be noted that for a specific process of operation S601, refer to related content described in FIG. 1 to FIG. 3. Details are not described herein again.

S602: Calculate a second current value based on input power of the first converter and a power threshold, where if the input current of the first converter is adjusted to the second current value, a difference between adjusted input power of the first converter and the power threshold is less than a difference between the unadjusted input power of the first converter and the power threshold.

The controller may include a power loop, and this operation may be performed by the power loop shown in FIG. 3.

In some embodiments, when the power loop succeeds in previous contention, the controller may further determine the second current value based on a proportion, an integral, and a derivative of a deviation between the input power of the first converter and the power threshold; or when the power loop fails in previous contention, the controller may further determine the second current value based on a proportion of a deviation between the input power of the first converter and the power threshold.

It should be noted that for operation S602, refer to related content described in FIG. 1 to FIG. 3. Details are not described herein again.

S603: Adjust the input current of the first converter based on the first current value and the second current value.

In some embodiments, when the first current value is a current value determined by the upper voltage limit loop, the controller may determine a smaller current value in the first current value and the second current value as a target current value, and determine a contention result between the upper voltage limit loop and the power loop. If the target current value is the first current value, the upper voltage limit loop succeeds in contention; or if the target current value is the second current value, the power loop succeeds in contention. Further, the controller may separately feed back the contention result between the upper voltage limit loop and the power loop to the upper voltage limit loop and the power loop.

In some other embodiments, when the first current value is a current value determined by the upper voltage limit loop, the controller may determine a larger current value in the second current value and the third current value as a target current value, and determine a contention result between the lower voltage limit loop and the power loop. If the target current value is the third current value, the lower voltage limit loop succeeds in contention; or if the target current value is the second current value, the power loop succeeds in contention. Further, the controller may separately feed back the contention result between the lower voltage limit loop and the power loop to the lower voltage limit loop and the power loop.

Further, the controller may send a control instruction to the first converter. The control instruction is used to instruct to adjust the input current of the first converter, so that the input current of the first converter is equal to the target current value.

It should be noted that for a process of this operation, refer to related content described in FIG. 1 to FIG. 3. Details are not described herein again.

FIG. 7 is a flowchart of yet another control method according to an embodiment of this application. The method may be applied to the power system shown in FIG. 1, and the power system runs in the scenario shown in FIG. 2B. The method may be performed by a controller, and the method may include some or all of the following operations.

S701: Calculate a fourth current value based on a voltage of a bus and a voltage threshold, where if an output current of a second converter is adjusted to the fourth current value, a difference between an adjusted voltage of the direct current bus and the voltage threshold is less than a difference between the unadjusted voltage of the direct current bus and the voltage threshold.

The controller may include an upper voltage limit loop and/or a lower voltage limit loop, and this operation may be performed by the upper voltage limit loop or the lower voltage limit loop shown in FIG. 3.

In some embodiments, when the upper voltage limit loop succeeds in previous contention, the controller may further determine the fourth current value based on a proportion, an integral, and a derivative of a deviation between the voltage of the bus and an upper limit; or when the upper voltage limit loop fails in previous contention, the controller may further determine the fourth current value based on a proportion of a deviation between the voltage of the bus and an upper limit.

In some other embodiments, when the lower voltage limit loop succeeds in previous contention, the controller may determine a sixth current value based on a proportion, an integral, and a derivative of a deviation between the voltage of the bus and a lower limit; or when the lower voltage limit loop fails in previous contention, the controller may determine a sixth current value based on a proportion of a deviation between the voltage of the bus and a lower limit.

It should be noted that for a specific process of operation S701, refer to related content described in FIG. 1 to FIG. 3. Details are not described herein again.

S702: Calculate a fifth current value based on output power of the second converter and a power threshold, where if the output current of the second converter is adjusted to the fifth current value, a difference between adjusted output power of the second converter and the power threshold is less than a difference between the unadjusted output power of the second converter and the power threshold.

The controller may include a power loop, and this operation may be performed by the power loop shown in FIG. 3.

In some embodiments, when the power loop succeeds in previous contention, the controller may further determine the fifth current value based on a proportion, an integral, and a derivative of a deviation between the output power of the second converter and the power threshold; or when the power loop fails in previous contention, the controller may further determine the fifth current value based on a proportion of a deviation between the output power of the second converter and the power threshold.

It should be noted that for operation S702, refer to related content described in FIG. 1 to FIG. 3. Details are not described herein again.

S703: Adjust the output current of the second converter based on the fourth current value and the fifth current value.

In some embodiments, when a first current value is a current value determined by the upper voltage limit loop, the controller may determine a larger current value in the fourth current value and the fifth current value as a target current value, and determine a contention result between the upper voltage limit loop and the power loop. If the target current value is the fourth current value, the upper voltage limit loop succeeds in contention; or if the target current value is the fifth current value, the power loop succeeds in contention.

In some other embodiments, when a first current value is a current value determined by the upper voltage limit loop, the controller may determine a smaller current value in the sixth current value and the fifth current value as a target current value, and determine a contention result between the lower voltage limit loop and the power loop. If the target current value is the sixth current value, the lower voltage limit loop succeeds in contention; or if the target current value is the fifth current value, the power loop succeeds in contention.

Further, the controller may send a control instruction to a first converter. The control instruction is used to instruct to adjust the output current of the second converter, so that the output current of the second converter is equal to the target current value.

It should be noted that for a process of this operation, refer to related content described in FIG. 1 to FIG. 3. Details are not described herein again.

It may be clearly understood by a person skilled in the art that, for convenient and brief description, for a corresponding process in the foregoing method embodiments, refer to a specific working process of the apparatus and the units described above. Details are not described herein again.

In addition, functional units in embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

Embodiments in this specification are all described in a progressive manner, for same or similar parts in embodiments, reference may be made to these embodiments, and each embodiment focuses on a difference from other embodiments. The method disclosed in embodiments corresponds to the apparatus disclosed in embodiments, and therefore is briefly described. For related parts, refer to the description of the apparatus.

It should be noted that, for brief description, the foregoing method embodiments are represented as a series of actions. However, a person skilled in the art should appreciate that this application is not limited to the described order of the actions, because according to this application, some operations may be performed in other orders or simultaneously.

A sequence of the operations of the method in embodiments of this application may be adjusted, combined, or removed based on an actual requirement.

The implementations of this application may be randomly combined to achieve different technical effects.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, the procedure or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid-State Disk)), or the like.

In short, the foregoing descriptions are only embodiments of the technical solutions of the present disclosure, but are not intended to limit the protection scope of the present disclosure. Any modification, equivalent replacement, or improvement made according to the disclosure of the present disclosure shall fall within the protection scope of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A power system, wherein the power system comprises a first converter, wherein an input terminal of the first converter is configured to connect to a direct current bus, and an output terminal of the first converter is connected to a power grid or a load; and
a controller configured to
control an output power of the first converter;
adjust an output current of the first converter to a first current value based on a voltage of the direct current bus and a voltage threshold, wherein a difference between an adjusted voltage of the direct current bus and the voltage threshold is less than a difference between the voltage of the direct current bus and the voltage threshold;
adjust the output current of the first converter to a second current value based on the output power of the first converter and a power threshold, wherein a difference between an adjusted output power of the first converter and the power threshold is less than a difference between the output power of the first converter and the power threshold; and adjust the output current of the first converter based on the first current value and the second current value.

2. The system according to claim 1, wherein the voltage threshold is an upper limit of the voltage of the direct current bus, and the controller comprises
   an upper voltage limit loop configured to adjust the output current of the first converter to the first current value based on the voltage of the direct current bus and the upper limit;
   a power loop configured to adjust the output current of the first converter to the second current value based on the output power of the first converter and the power threshold; and
   wherein the controller is configured to: adjust the output current of the first converter to a larger current value of the first current value and the second current value, and determine a contention result between the upper voltage limit loop and the power loop, wherein, in response to the first current value being greater than the second current value, the upper voltage limit loop succeeds in contention; in response to the second current value being greater than the first current value, the power loop succeeds in contention.

3. The system according to claim 1, wherein the voltage threshold is a lower limit of the voltage of the direct current bus, and the controller comprises
   a lower voltage limit loop configured to adjust the output current of the first converter to a third current value based on the voltage of the direct current bus and the lower limit;
   a power loop configured to adjust the output current of the first converter to the second current value based on the output power of the first converter and the power threshold; and
   wherein the controller is configured to: adjust the output current of the first converter to a smaller current value of the second current value and the third current value, and determine a contention result between the lower voltage limit loop and the power loop, wherein, in response to the third current value being less than the second current value, the lower voltage limit loop succeeds in contention; in response to the second current value is less than the third current value, the power loop succeeds in contention.

4. The system according to claim 2, wherein the upper voltage limit loop is further configured to:
   when the upper voltage limit loop succeeds in a previous contention, obtain the first current value based on at least one of a proportion, an integral, or a derivative of a deviation between the voltage of the direct current bus and the upper limit; or
   when the upper voltage limit loop fails in the previous contention, obtain the first current value based on a proportion of a deviation between the voltage of the direct current bus and the upper limit.

5. The system according to claim 3, wherein the lower voltage limit loop is further configured to:
   when the lower voltage limit loop succeeds in a previous contention, obtain the third current value based on a proportion, an integral, or a derivative of a deviation between the voltage of the direct current bus and the lower limit; or
   when the lower voltage limit loop fails in the previous contention, obtain the third current value based on a proportion of a deviation between the voltage of the direct current bus and the lower limit.

6. The system according to claim 2, wherein the power loop is further configured to:
   when the power loop succeeds in a previous contention, obtain the second current value based on a proportion, an integral, or a derivative of a deviation between the output power of the first converter and the power threshold; or
   when the power loop fails in the previous contention, obtain the second current value based on a proportion of a deviation between the output power of the first converter and the power threshold.

7. The system according to claim 1, wherein the power system further comprises a second converter, wherein the controller is configured to
   control an input power of the second converter, an input terminal of the second converter is configured to connect to a battery, and an output terminal of the second converter is connected to the direct current bus;
   adjust an input current of the second converter to a fourth current value based on the voltage of the direct current bus and the voltage threshold, wherein a difference between an adjusted voltage of the direct current bus and the voltage threshold is less than a difference between the voltage of the direct current bus and the voltage threshold;
   adjust the input current of the second converter to a fifth current value based on the input power of the second converter and the power threshold, wherein a difference between an adjusted input power of the second converter and the power threshold is less than a difference between the input power of the second converter and the power threshold; and
   adjust the input current of the second converter based on the fourth current value and the fifth current value.

8. The system according to claim 7, wherein the voltage threshold is an upper limit of the voltage of the direct current bus, and the controller comprises
   an upper voltage limit loop configured to adjust the input current of the second converter to the fourth current value based on the voltage of the direct current bus and the upper limit;
   a power loop configured to adjust the input current of the second converter to the fifth current value based on the input power of the second converter and the power threshold; and
   the controller is configured to: adjust the input current of the second converter to a smaller current value of the fourth current value and the fifth current value, and determine a contention result between the upper voltage limit loop and the power loop, wherein, in response to the fourth current value being less than the fifth current value, the upper voltage limit loop succeeds in contention; in response to the fifth current value being less than the fourth current value, the power loop succeeds in contention.

9. The system according to claim 7, wherein the voltage threshold is a lower limit of the voltage of the direct current bus, and the controller comprises
   a lower voltage limit loop configured to adjust the input current of the second converter to a sixth current value based on the voltage of the direct current bus and the lower limit;
   a power loop configured to adjust the input current of the second converter to the fifth current value based on the input power of the second converter and the power threshold; and the controller is configured to: adjust the input current of the second converter to a larger current value of the sixth current value and the fifth current value, and determine a contention result between the lower voltage limit loop and the power loop, wherein, in response to the sixth current value being greater than the fifth current value, the lower voltage limit loop succeeds in contention; in response to the fifth current value being greater than the sixth current value, the power loop succeeds in contention.

10. The system according to claim 8, wherein the upper voltage limit loop is further configured to:
when the upper voltage limit loop succeeds in a previous contention, obtain the fourth current value based on at least one of a proportion, an integral, or a derivative of a deviation between the voltage of the direct current bus and the upper limit; or
when the upper voltage limit loop fails in previous contention, obtain the fourth current value based on a proportion of a deviation between the voltage of the direct current bus and the upper limit.

11. The system according to claim 9, wherein the lower voltage limit loop is further configured to:
when the lower voltage limit loop succeeds in a previous contention, obtain the sixth current value based on at least one of a proportion, an integral, or a derivative of a deviation between the voltage of the direct current bus and the lower limit; or
when the lower voltage limit loop fails in previous contention, obtain the sixth current value based on a proportion of a deviation between the voltage of the direct current bus and the lower limit.

12. The system according to claim 9, wherein the power loop is further configured to:
when the power loop succeeds in a previous contention, obtain the fifth current value based on at least one of a proportion, an integral, or a derivative of a deviation between the input power of the second converter and the power threshold; or
when the power loop fails in the previous contention, obtain the fifth current value based on a proportion of a deviation between the input power of the second converter and the power threshold.

13. A power system, comprising
a first converter, wherein an input terminal of the first converter is connected to a power grid, and an output terminal of the first converter is connected to a direct current bus; and
a controller configured to
control an input power of the first converter;
adjust an input current of the first converter to a first current value based on a voltage of the direct current bus and a voltage threshold, wherein a difference between an adjusted voltage of the direct current bus and the voltage threshold is less than a difference between the voltage of the direct current bus and the voltage threshold;
adjust the input current of the first converter to a second current value based on the input power of the first converter and a power threshold, wherein a difference between an adjusted input power of the first converter and the power threshold is less than a difference between the input power of the first converter and the power threshold; and
adjust the input current of the first converter based on the first current value and the second current value.

14. The system according to claim 13, wherein the voltage threshold is an upper limit of the voltage of the direct current bus, and the controller comprises
an upper voltage limit loop configured to adjust the input current of the first converter to the first current value based on the voltage of the direct current bus and the upper limit;
a power loop configured to adjust the input current of the first converter to the second current value based on the input power of the first converter and the power threshold; and
the controller is configured to: adjust the input current of the first converter to a smaller current value of the first current value and the second current value, and determine a contention result between the upper voltage limit loop and the power loop, wherein, in response to the first current value being less than the second current value, the upper voltage limit loop succeeds in contention; in response to the second current value being less than the first current value, the power loop succeeds in contention.

15. The system according to claim 13, wherein the voltage threshold is a lower limit of the voltage of the direct current bus, and the controller comprises
a lower voltage limit loop configured to adjust the input current of the first converter to a third current value based on the voltage of the direct current bus and the lower limit;
a power loop configured to adjust the input current of the first converter to the second current value based on the input power of the first converter and the power threshold; and
the controller is configured to: adjust the input current of the first converter to a larger current value of the second current value and the third current value, and determine a contention result between the lower voltage limit loop and the power loop, wherein, in response to the third current value is greater than the second current value, the lower voltage limit loop succeeds in contention; in response to the second current value is greater than the third current value, the power loop succeeds in contention.

16. A control method, applied to a power system, the method comprising:
calculating a first current value based on a voltage of a direct current bus and a voltage threshold, wherein the power system comprises a first converter and a controller, the controller is configured to control an output power of the first converter, an input terminal of the first converter is connected to the direct current bus, and an output terminal of the first converter is connected to a power grid or a load, wherein, in response to an output current of the first converter being adjusted to the first current value, a difference between an adjusted voltage of the direct current bus and the voltage threshold is less than a difference between the voltage of the direct current bus and the voltage threshold;
calculating a second current value based on the output power of the first converter and a power threshold, wherein, in response to the output current of the first converter being adjusted to the second current value, a difference between adjusted output power of the first converter and the power threshold is less than a difference between the output power of the first converter and the power threshold; and adjusting the output current of the first converter based on the first current value and the second current value.

17. The method according to claim 16, wherein the voltage threshold is an upper limit of the voltage of the direct current bus or a lower limit of the voltage of the direct current bus, and the controller comprises at least one of an upper voltage limit loop or a lower voltage limit loop; and wherein the calculating a first current value based on a voltage of the direct current bus and a voltage threshold comprises:

calculating, by the upper voltage limit loop, the first current value based on the voltage of the direct current bus and the upper limit; or calculating, by the lower voltage limit loop, a third current value based on the voltage of the direct current bus and the lower limit.

18. The method according to claim 17, wherein the controller comprises a power loop, and the wherein calculating a second current value based on the output power of the first converter and a power threshold comprises:

calculating, by the power loop, the second current value based on the output power of the first converter and the power threshold.

19. The method according to claim 18, wherein the voltage threshold is the upper limit of the voltage of the direct current bus, and the adjusting the output current of the first converter based on the first current value and the second current value comprises:

adjusting the output current of the first converter to a larger current value of the first current value and the second current value; and determining a contention result between the upper voltage limit loop and the power loop, wherein in response to the first current value being greater than the second current value, the upper voltage limit loop succeeds in contention; in response to the second current value being greater than the first current value, the power loop succeeds in contention.

20. The method according to claim 18, wherein the voltage threshold is the lower limit of the voltage of the direct current bus, and wherein the adjusting the output current of the first converter based on the first current value and the second current value comprises:

adjusting the output current of the first converter to a smaller current value of the second current value and the third current value; and determining a contention result between the lower voltage limit loop and the power loop, wherein in response to the third current value being less than the second current value, the lower voltage limit loop succeeds in contention; in response to the second current value being less than the third current value, the power loop succeeds in contention.

* * * * *